United States Patent
Tanaka et al.

(10) Patent No.: US 11,524,648 B2
(45) Date of Patent: Dec. 13, 2022

(54) OCCUPANT PROTECTION SYSTEM

(71) Applicant: TOYODA GOSEI CO., LTD., Kiyosu (JP)

(72) Inventors: Motoyuki Tanaka, Kiyosu (JP); Takeki Hayashi, Kiyosu (JP); Yasushi Masuda, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 98 days.

(21) Appl. No.: 17/016,871

(22) Filed: Sep. 10, 2020

(65) Prior Publication Data

US 2021/0094496 A1    Apr. 1, 2021

(30) Foreign Application Priority Data

Sep. 30, 2019 (JP) ............... JP2019-178713

(51) Int. Cl.
   *B60R 21/18*    (2006.01)
   *B60R 21/231*   (2011.01)
   *B60R 21/00*    (2006.01)

(52) U.S. Cl.
   CPC ........ *B60R 21/18* (2013.01); *B60R 21/23138* (2013.01); *B60R 2021/0048* (2013.01);
   (Continued)

(58) Field of Classification Search
   CPC . B60R 21/18; B60R 2021/0048; B60R 21/20; B60R 21/231
   See application file for complete search history.

(56) References Cited

U.S. PATENT DOCUMENTS 5,871,230 A * 2/1999 Lewis ............... B60R 22/14
                                              280/743.1
7,600,780 B2 * 10/2009 Tobata ............. B60R 21/18
                                              280/736
(Continued)

FOREIGN PATENT DOCUMENTS

JP    2000142303 A   *  5/2000
JP    2007269302 A   * 10/2007
(Continued)

OTHER PUBLICATIONS

M. Kuwabara, Side Crash Passenger Protector JP 2014-196014A Machine English Translator, ip.com (Year: 2014).*
(Continued)

*Primary Examiner* — Karen Beck
(74) *Attorney, Agent, or Firm* — Posz Law Group, PLC

(57) ABSTRACT

An occupant protection system for protecting a vehicle occupant sitting in a seat includes a seatbelt that includes a lap belt for arresting the pelvis of the occupant, and an airbag disposed in the lap belt. The airbag is coupled to the lap belt in such a manner as to be movable relative to the lap belt in a left and right direction, and includes a main inflatable portion that is deployable in front of upper body of the occupant, and a positioning inflatable portion that protrudes from a lower end region of the main inflatable portion. The positioning inflatable portion includes a contact surface that contacts and is supported by an environmental member which is disposed in a circumference of the lap belt at airbag deployment, whereby helps align a center in the left and right direction of the main inflatable portion generally with that of the upper body.

6 Claims, 17 Drawing Sheets

Schematic Sectional View at A-A

(52) U.S. Cl.
    CPC .............. *B60R 2021/0053* (2013.01); *B60R 2021/23146* (2013.01)

(56) References Cited

U.S. PATENT DOCUMENTS

| | | | | |
|---|---|---|---|---|
| 2006/0022441 | A1* | 2/2006 | Hayashi | B60R 21/207 |
| | | | | 280/730.2 |
| 2007/0001435 | A1* | 1/2007 | Gray | B60R 21/18 |
| | | | | 280/733 |
| 2010/0025972 | A1 | 2/2010 | Nezaki | |
| 2015/0069741 | A1 | 3/2015 | Shimazu | |
| 2019/0071051 | A1* | 3/2019 | Board | B60R 22/023 |
| 2020/0122668 | A1* | 4/2020 | Ozaki | B60R 21/215 |
| 2021/0094496 | A1* | 4/2021 | Tanaka | B60R 21/20 |
| 2021/0300277 | A1* | 9/2021 | Fukaura | B60R 21/233 |

FOREIGN PATENT DOCUMENTS

| | | | | | |
|---|---|---|---|---|---|
| JP | 2010-36665 | A | | 2/2010 | |
| JP | 2011140300 | A | * | 7/2011 | ............ B60R 21/18 |
| JP | 2012-56380 | A | | 3/2012 | |
| JP | 2014-196014 | A | | 10/2014 | |
| JP | 2014196014 | A | * | 10/2014 | ............ B60R 21/18 |
| JP | 2015-51744 | A | | 3/2015 | |
| JP | 2015051744 | A | * | 3/2015 | ............ B60R 21/18 |
| JP | 2019182417 | A | * | 10/2019 | ............ B60R 21/18 |
| JP | 2021054250 | A | * | 4/2021 | ............ B60R 21/18 |
| JP | 2021160413 | A | * | 10/2021 | ............ B60R 21/18 |
| WO | WO-0100456 | A1 | * | 1/2001 | ............ B60R 21/18 |

OTHER PUBLICATIONS

K. Shimazu, Vehicle Occupant Protector JP 2015-051744A Machine English Translator, ip.com (Year: 2015).*

Office Action dated Aug. 26, 2022 of Japanese Patent Application No. 2019-178713 (and English machine translation).

* cited by examiner

Schematic Sectional View at A-A

OCCUPANT PROTECTION SYSTEM

CROSS REFERENCE TO RELATED APPLICATIONS

The present application claims priority from Japanese Patent Application No. 2019-178713 of Tanaka et al., filed on Sep. 30, 2019, the entire disclosure of which is incorporated herein by reference.

BACKGROUND

1. Technical Field

The present disclosure relates to an occupant protection system for protecting a vehicle occupant sitting in a seat.

2. Description of Related Art

JP 2010-036665 A discloses, in FIGS. 3 and 4, an occupant protection system for protecting a vehicle occupant sitting in a seat. The system includes a four-point seatbelt and two main airbags which are respectively stored in two shoulder belts of the seatbelt. The main airbags are configured to protrude from the shoulder belts and be deployed over the front surface of the upper body of the occupant. This occupant protection system further includes two position-keeping airbags which are configured to be inflated and deployed beneath the main airbags, respectively, on a side towards the door and on a side towards the center console for keeping the positions of the main airbags with respect to the occupant. The position-keeping airbags are configured to receive a supply of inflation gas from an inflator separate from that for inflating the main airbags. That is, the occupant protection system disclosed in the above-described literature has a complicated structure.

SUMMARY

An exemplary embodiment of the present disclosure relates to an occupant protection system for protecting an occupant sitting in a seat of a vehicle, the occupant protection system including: a three-point seatbelt that includes a lap belt which is configured to arrest a pelvic region of the occupant; an inflator; and an airbag that is formed of a sheet material having flexibility and stored in a storage in the lap belt in a folded form. The airbag is coupled to the lap belt in such a manner as to be movable in a left and right direction with respect to the lap belt, and configured to be inflated and deployed upward from the storage when fed with an inflation gas from the inflator. The airbag includes: a main inflatable portion that is configured to be deployed in front of an upper body of the occupant for protecting the upper body; and a positioning inflatable portion that protrudes at least from a first end in a left and right direction of a lower end region of the main inflatable portion, the positioning inflatable portion including a contact surface that contacts and is supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment.

BRIEF DESCRIPTION OF DRAWINGS

FIG. 3 is a front view of the seat of FIG. 1 with a seatbelt buckled in.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
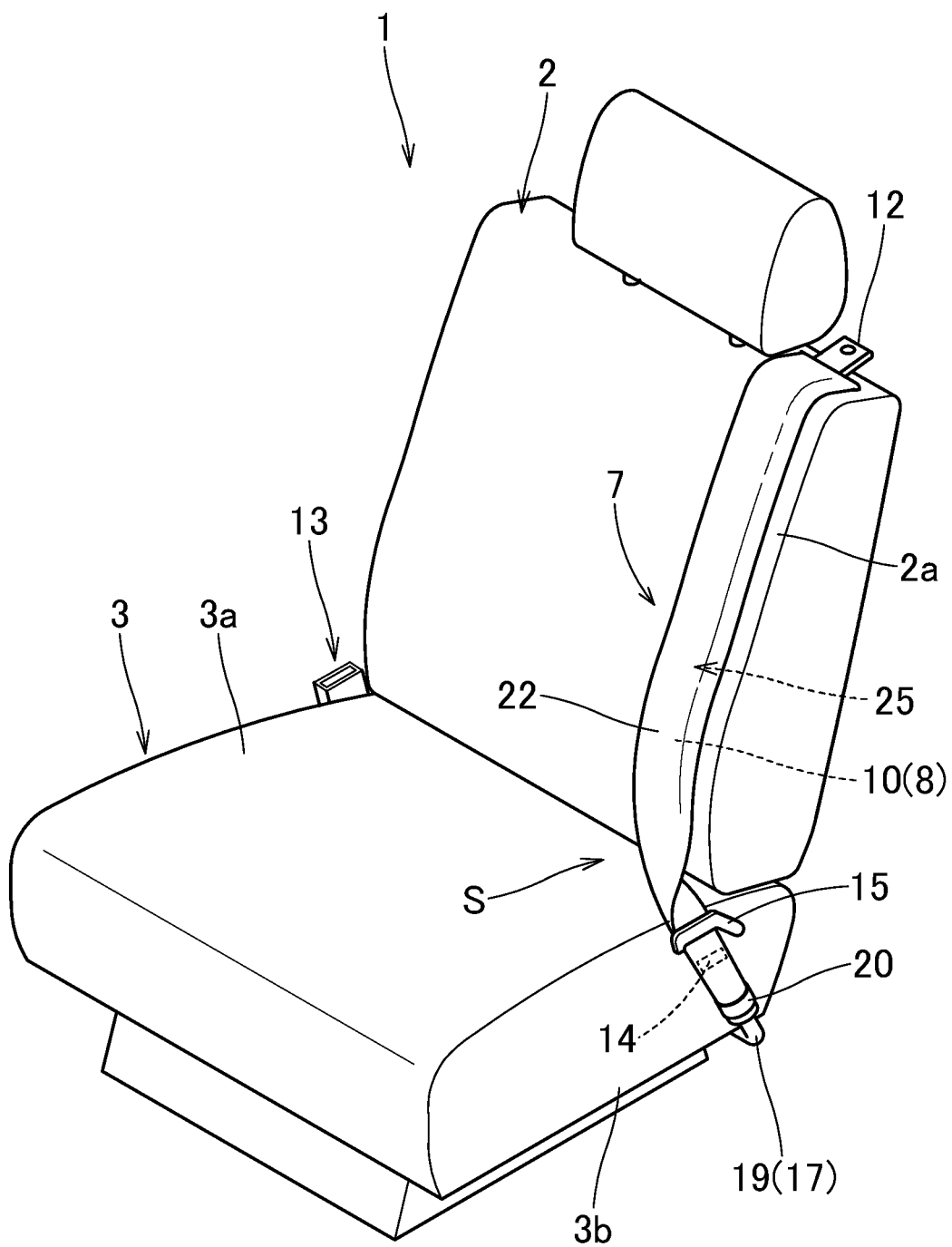
FIG. 1 is a perspective view of a seat on which an occupant protection system in accordance with an exemplary embodiment is mounted.
Figure 2:
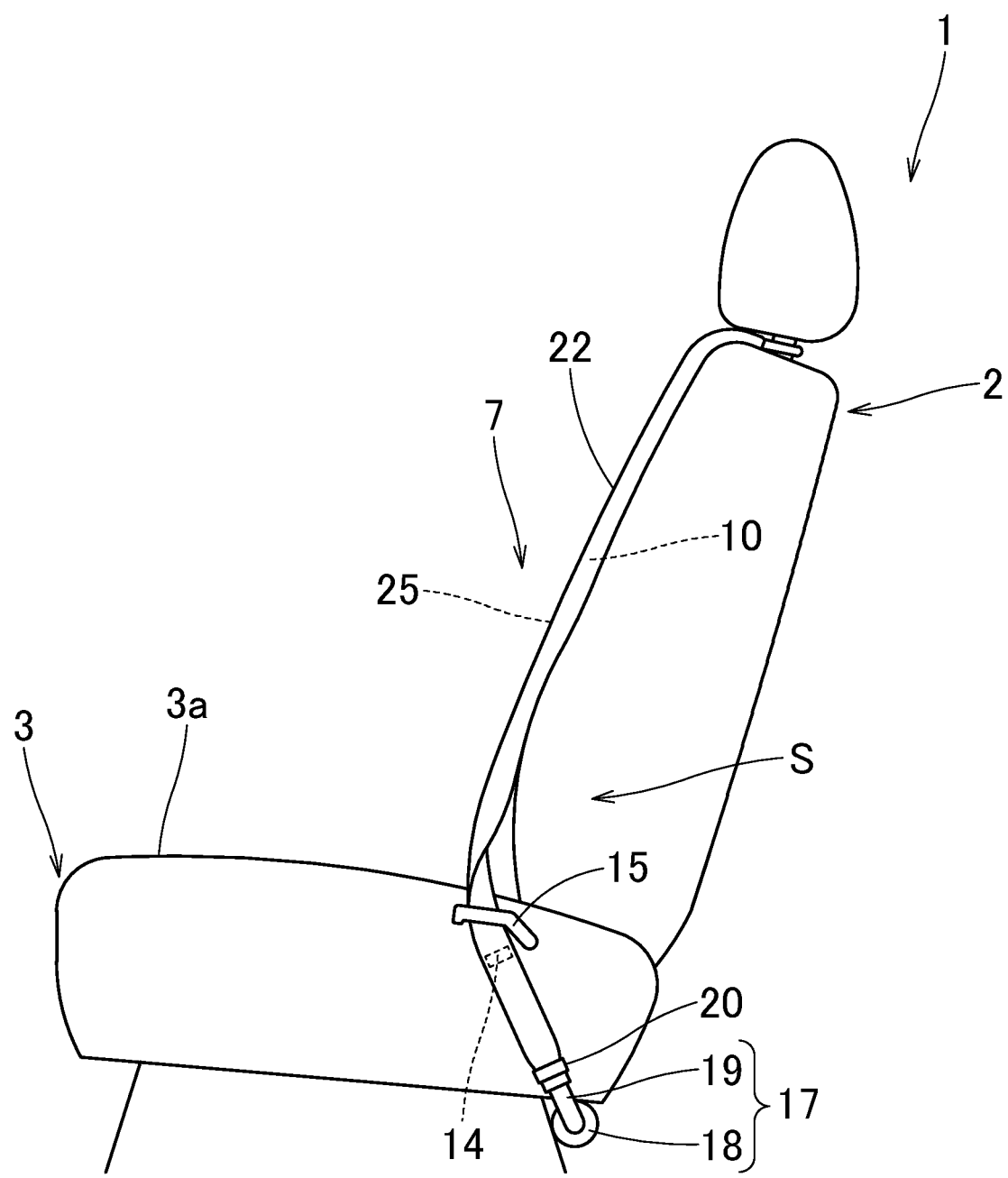
FIG. 2 is a side view of the seat of FIG. 1.
Figure 3:
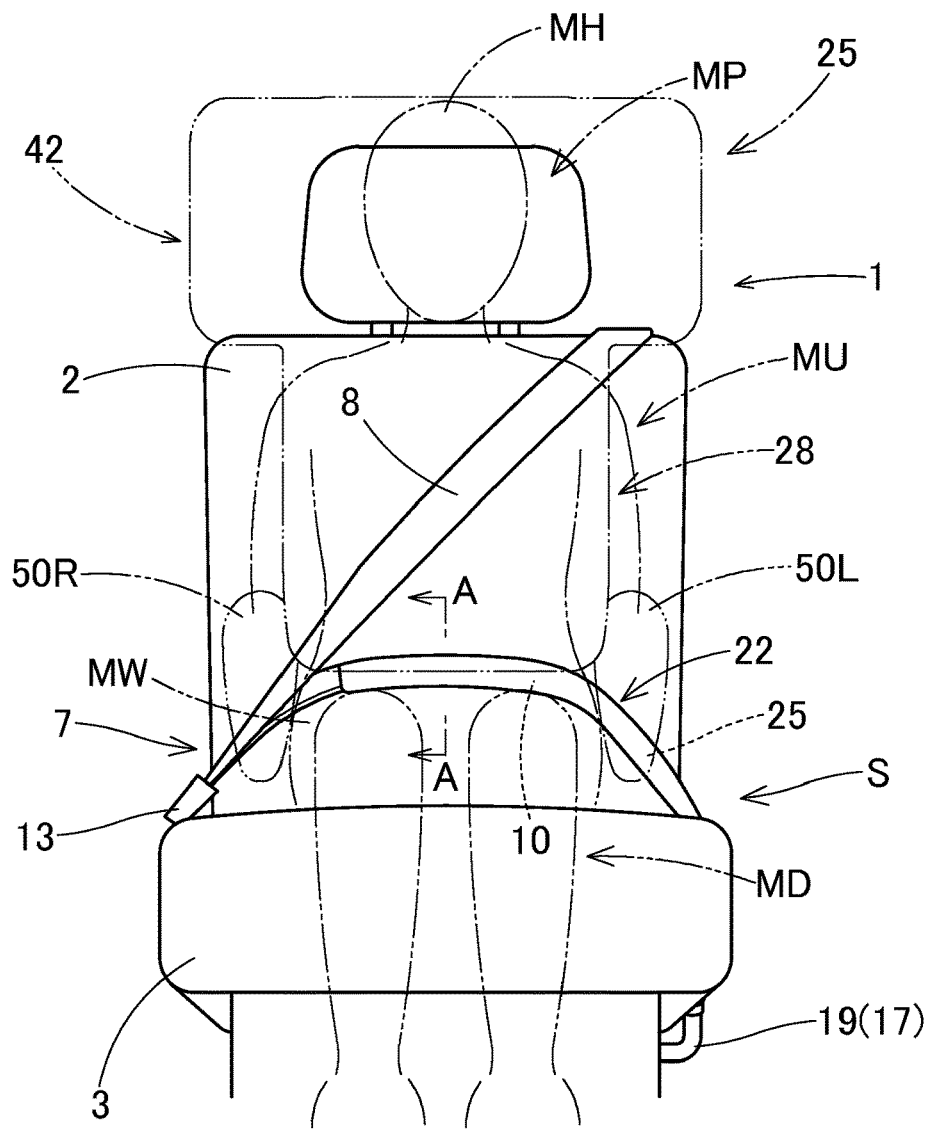
Figure 3:
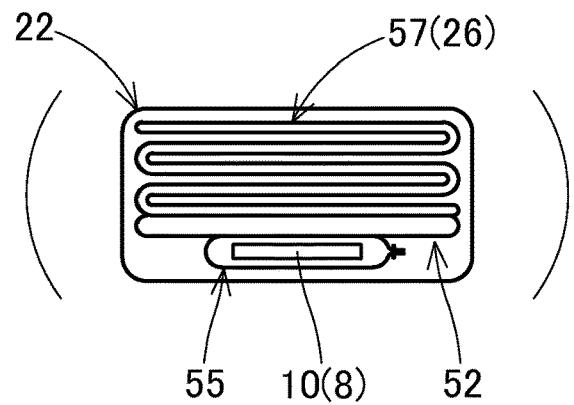
Figure 4:
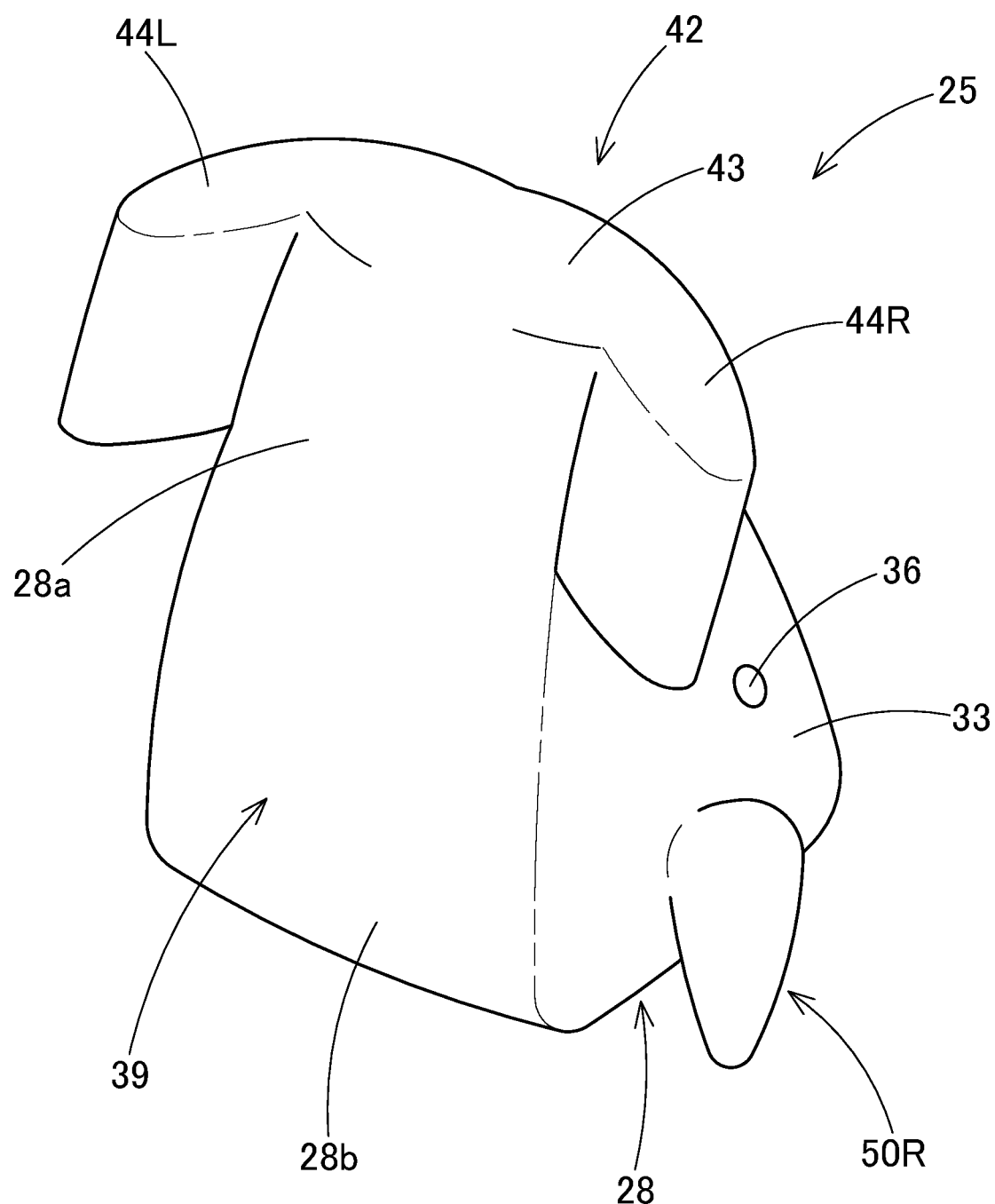
FIG. 4 is a schematic perspective view of an airbag used in the occupant protection system in accordance with the exemplary embodiment, the airbag being inflated by itself and viewed from the back.

As shown in FIGS. 1 to 3, an occupant protection system S is installed in a seat 1 of a vehicle, and includes a seatbelt 7, an airbag 25 and an inflator 17. The seat 1 includes a seatback 2 and a seat portion 3.

Unless otherwise specified, front and back, up and down, and left and right directions in this specification correspond to front and back, up and down, and left and right directions of the seat 1.

The seatbelt 7 is a three-point seatbelt, and includes a belt body 8 for restraining an occupant MP sitting in the seat 1, a tongue plate 12 which is attached to the belt body 8, and a buckle 13 for engagement with the tongue plate 12. A not-shown retractor is located inside of the seatback 2, and the belt body 8 is retained by a reel shaft of the retractor by the first end, and retained, by the second end, by an anchor member 14 (FIGS. 1 and 2) located in a left side of a rear end 3b region of the seat portion 3. More specifically, the belt body 8 is arranged to protrude from a left upper end portion of the seatback 2 such that a later-described lap belt 10, which includes an airbag 25 as will be described below, is exposed on a front surface of the backrest 2 when not worn by the occupant, as can be seen in FIGS. 1 and 2. The belt body 8 includes a lap belt 10, and a shoulder belt 9 which is stored inside of the seatback 2. When the occupant pulls the belt body 8 from the reel shaft and buckles the tongue plate 12 in the buckle 13, the lap belt 10 extends generally in a left and right direction between the anchor member 14 and buckle 13 and restrains the lower body MD (pelvic region MW) of the occupant MP while the shoulder belt 9 extends diagonally from the left upper end portion of the seatback 2 to the buckle 13 and restrains the upper body MU (shoulder to thorax) of the occupant MP, as can be seen in FIG. 3. The belt body 8 is configured to be pulled out according to the physical size of the occupant MP when buckled in. In this specific embodiment, the lap belt 10 is configured to be exposed on the front surface of the backrest 2 in a left edge region 2a of the backrest 2 and extend generally in an up and down direction, when not worn by the occupant, as can be seen in FIG. 1.

The inflator 17 is disposed farther downward than a seat surface 3a of the seat 1. In this specific embodiment, as can be seen in FIG. 2, the inflator 17 includes a generally cylindrical inflator body 18 which is disposed beneath the seat portion 3 and in a vicinity of the back of the seat 1 in such a manner as to extend generally in the left and right direction, though not depicted in detail, and a pipe 19 which extends from the inflator body 18 for feeding the airbag 25 with an inflation gas. The pipe 19 is made from metal and extends from the inflator body 18. The leading end of the pipe 19 is located in a vicinity of the border between the seat portion 3 and seatback 2 in the left side of the seat 1, and is connected with a later-described conduit portion 52 of the airbag 25 with a clamp 20.

The airbag 25 is disposed in the lap belt 10 region in a folded form 57. The folded form 57 is a form of a later-described bag body 26 as folded in an elongated shape. More particularly, the bag body 26 in the folded form 57 and the conduit portion 52 which extends from the bag body 26 are stacked on the lap belt 10, as can be seen in FIG. 3. That is, in the not-worn state as can be seen in FIG. 1, the bag body 26 in the folded form 57 and the conduit portion 52 are disposed on a back side of the lap belt 10 to face the seatback 2. In this specific embodiment, the lap belt 10, the bag body 26 in the folded form 57 and the conduit portion 52 are wrapped by a cover 22 which is configured to break at airbag deployment as can be seen in FIG. 3, thus the bag body 26 and the conduit portion 52 are integrated with the lap belt 10. That is, a void space formed between the lap belt 10 and the cover 22 constitutes a storage of the airbag 25.

The airbag 25 is coupled to the lap belt 10 in such a manner as to be movable relative to the lap belt 10 in a left and right direction. As can be seen in FIGS. 4 to 9, the airbag 25 includes a bag body 26, a conduit portion 52 which is connected with the inflator 17 for feeding the bag body 26 with an inflation gas, and a mounting portion 55 which attaches the bag body 26 to the lap belt 10. The airbag 25 is made of a sheet material having flexibility. In this specific embodiment, the airbag 25 is made of a fabric woven with polyester yarns, polyamide yarns or the like.

The bag body 26 of this specific embodiment includes a main inflatable portion 28 for protecting the upper body MU of the occupant MP, a head protecting portion 42 which is disposed in a vicinity of an upper end 28a of the main inflatable portion 28, and a pair of thigh arresting portions 50L, 50R which are disposed in a vicinity of a lower end 28b of the main inflatable portion 28 and each serve as a positioning inflatable portion.

Figure 5:
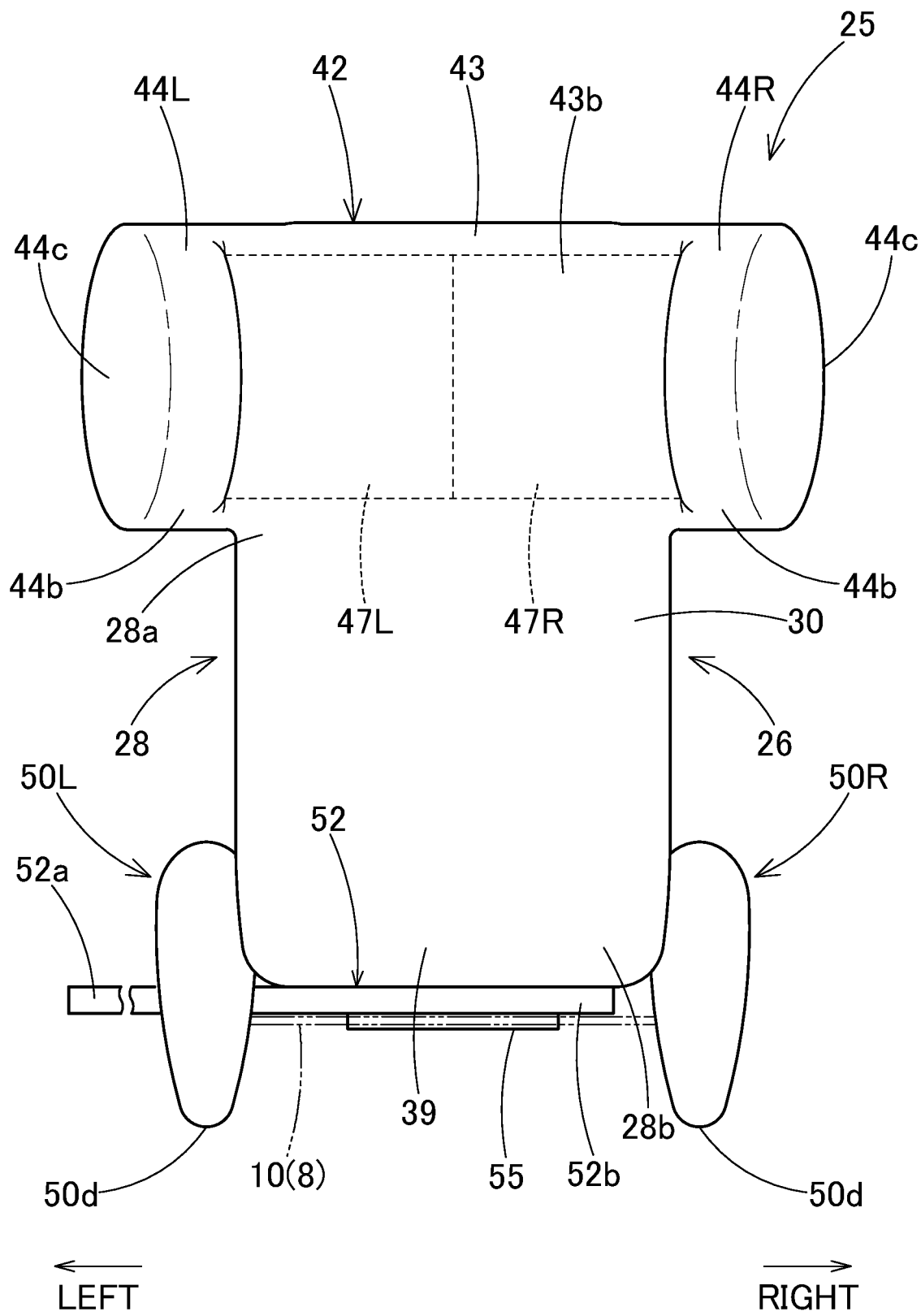
FIG. 5 is a back view of the airbag of FIG. 4.
Figure 6:
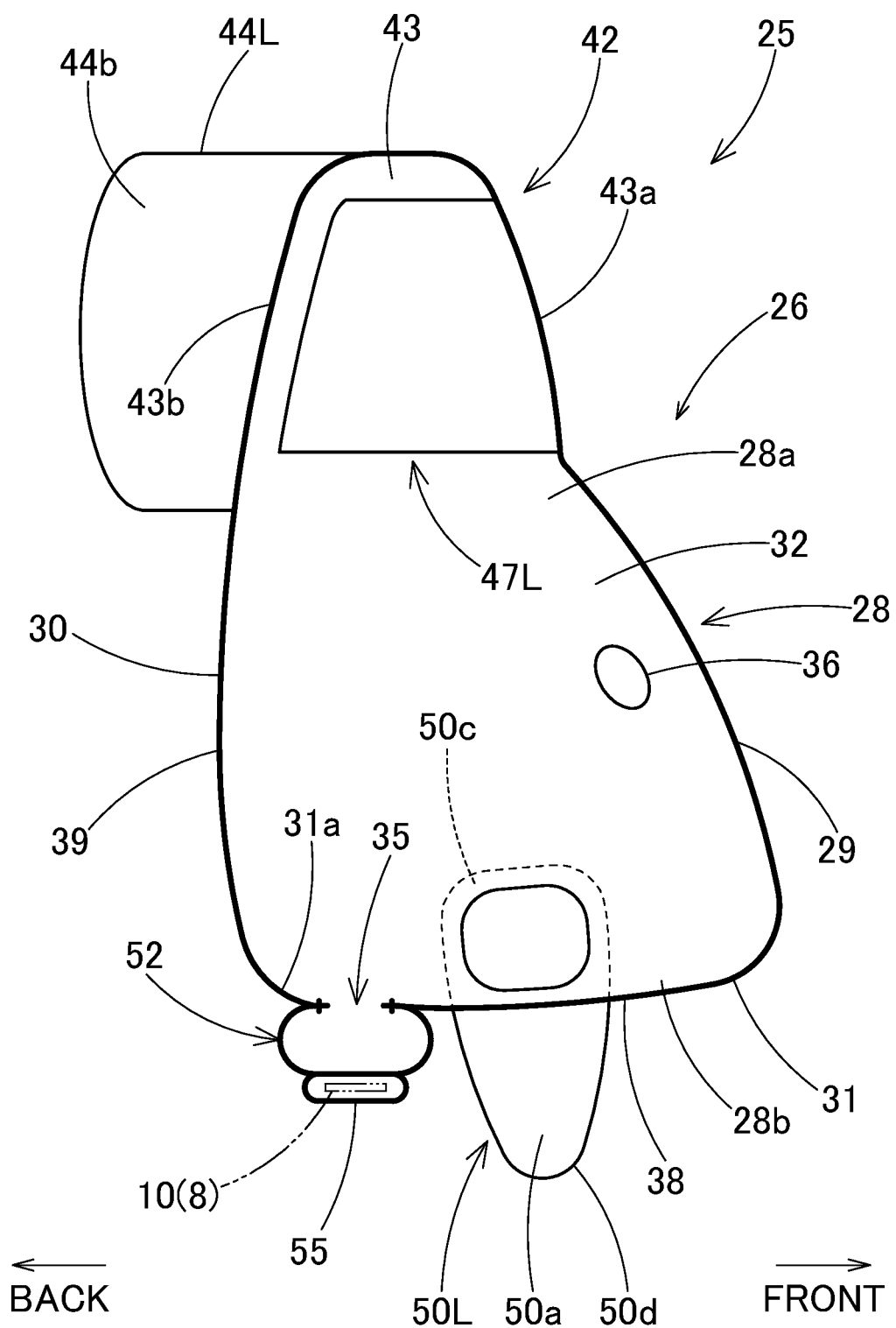
FIG. 6 is a schematic vertical sectional view of the airbag of FIG. 4 taken along a front and back direction.
Figure 8:
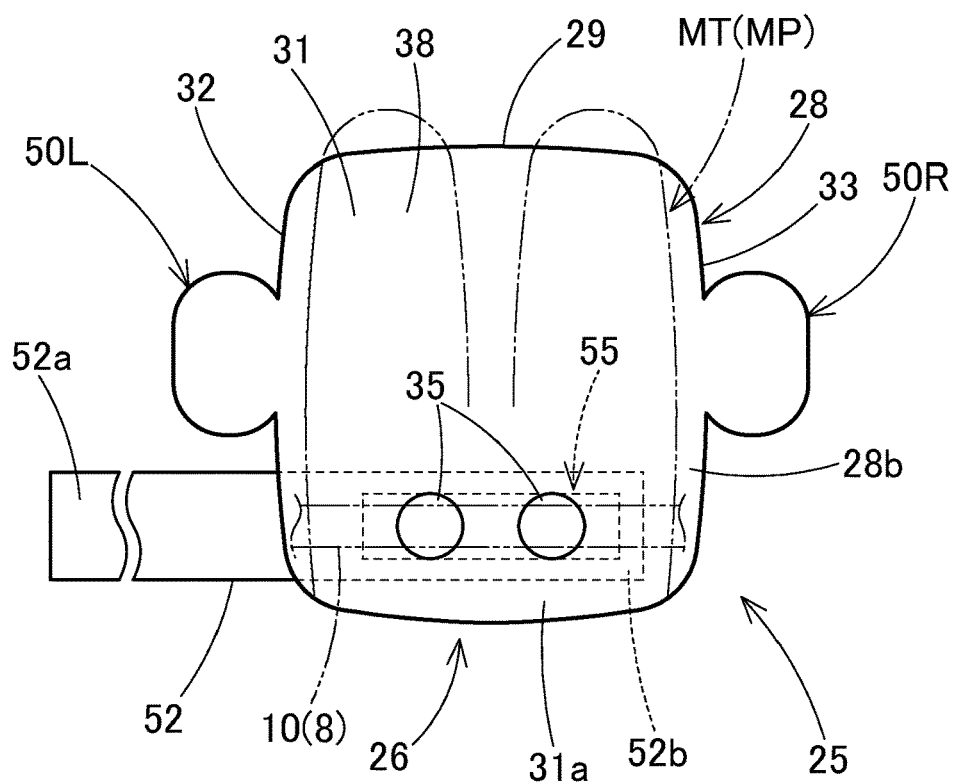
FIG. 8 is a schematic horizontal sectional view of the airbag of FIG. 4 taken at thigh arresting portions.
Figure 11:
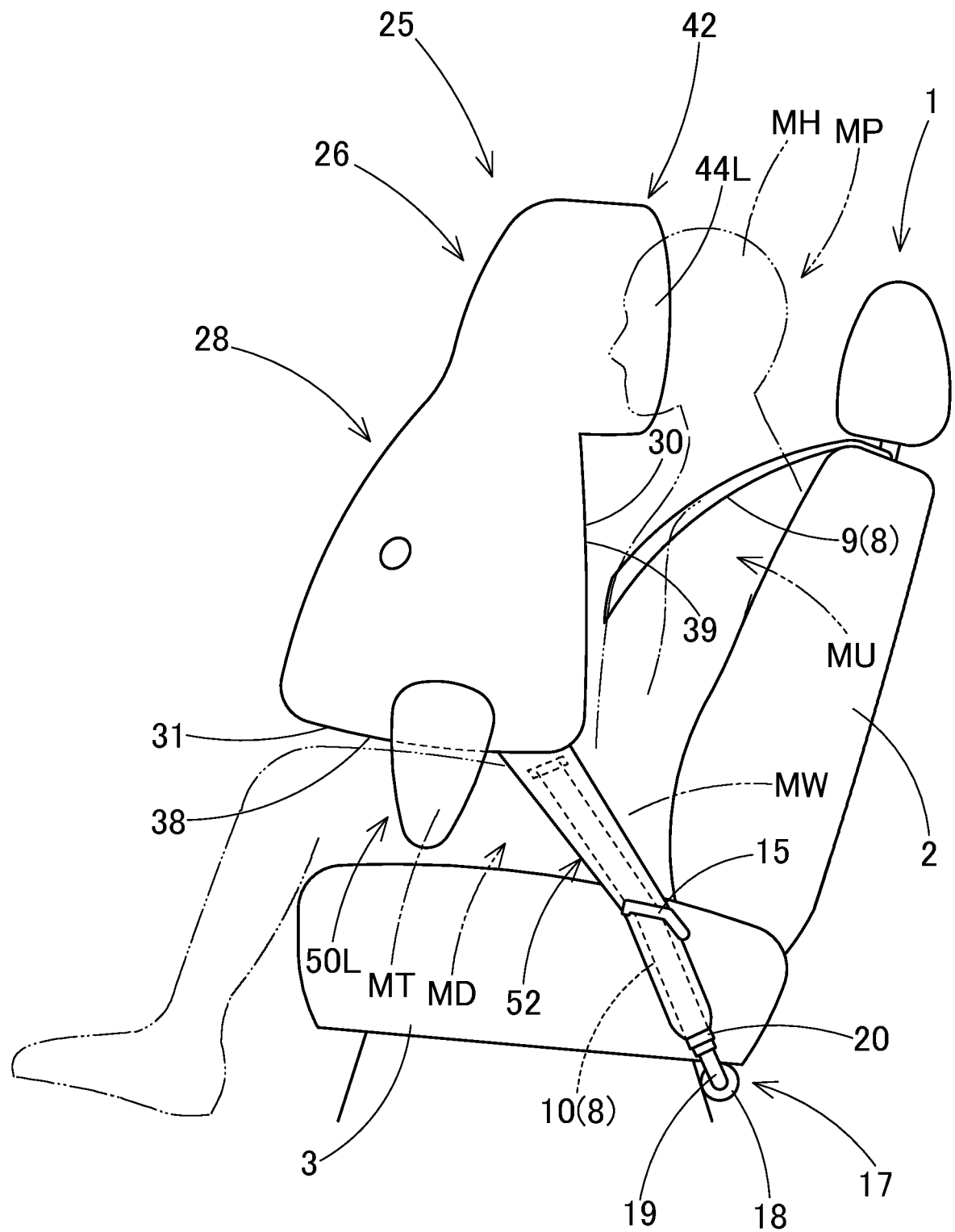
FIG. 11 is a side view of the seat at airbag deployment.

The main inflatable portion 28 for protecting the upper body MU of the occupant MP is configured to be inflated into a generally triangular prism extending generally in a left and right direction. More particularly, as can be seen in FIGS. 5 and 6, the main inflatable portion 28 as fully deployed has a generally right triangular shape which has the oblique side in the front, when viewed from a side (i.e. from left or right), and has a generally rectangular shape elongated in an up and down direction when viewed from front or back. The main inflatable portion 28 includes a front wall 29 which is configured to be deployed in the front side facing away from the occupant MP, a rear upper wall 30 and a rear lower wall 31 which are configured to be deployed towards the occupant MP, and a left wall 32 and a right wall 33 which are configured to oppose each other in the left and right direction at airbag deployment. The left wall 32 and right wall 33 are each provided with a vent hole 36 for releasing an extra inflation gas. The rear upper wall 30 constitutes an upper-body arresting surface 39 which is configured to be deployed in front of the occupant MP for arresting the upper body MU of the occupant MP. As can be seen in FIG. 11, the rear upper wall 30 (or upper-body arresting surface 39) is configured to extend generally along an up and down direction in proximity to the upper body MU of the occupant MP at airbag deployment. The rear lower wall 31 is configured to extend generally along a front and back direction, along the thighs MT of the occupant MP at airbag deployment. The main inflatable portion 28 is provided with at least one communication hole 35 which provides gas communication between the main inflatable portion 28 and the conduit portion 52, in a vicinity of the center in the left and right direction of and at a rear end 31a of the rear lower wall 31, so as to receive an inflation gas from the conduit portion 52, as can be seen in FIGS. 6 and 8. More specifically, two communication holes 35 are arranged side by side along the left and right direction in a vicinity of the center in the left and right direction of the main inflatable portion 28, as can be seen in FIG. 8. In the main inflatable portion 28 of this embodiment, a region of the rear lower wall 31 located farther forward than the conduit portion 52 at airbag deployment constitutes a thigh contact surface 38 which contacts with upper surfaces of the thighs MT of the occupant MP at airbag deployment. In this specific embodiment, a width in the up and down direction and a width in the left and right direction of the main inflatable portion 28 as fully inflated are set such that the rear upper wall 30 (or upper-body arresting surface 39) is able to cover generally an entirety of the upper body MU of the occupant MP except the head MH. A width in the front and back direction of the main inflatable portion 28 as fully inflated is set such that the rear lower wall 31 (or the thigh contact surface 38) is able to cover the upper surfaces of the thighs MT to a vicinity of knees.

Figure 7:
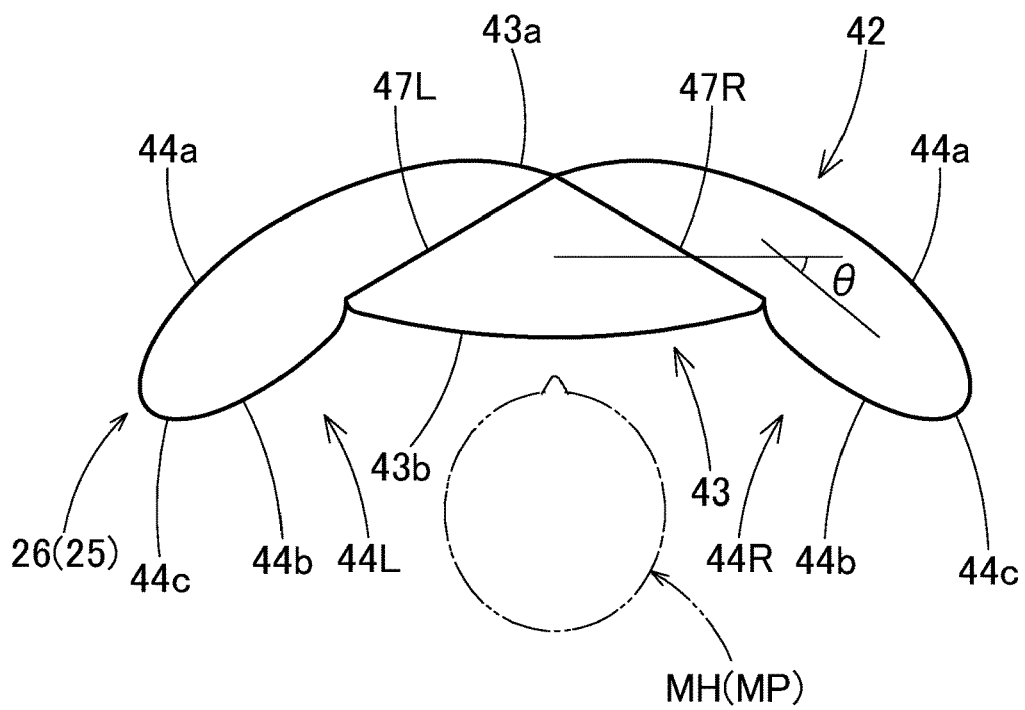
FIG. 7 is a schematic horizontal sectional end view of the airbag of FIG. 4 taken at a head protecting portion.

The head protecting portion 42 includes a front inflatable portion 43 which is deployable in front of the head MH and a pair of side inflatable portions 44L, 44R which extend rearward from opposite ends in the left and right direction of the front inflatable portion 43. As can be seen in FIG. 6, the front inflatable portion 43 is continuous with and extends upward from the upper end 28a of the main inflatable portion 28. A width in the left and right direction of the front inflatable portion 43 is generally identical to the width in the left and right direction of the main inflatable portion 28, as can be seen in FIG. 5. The side inflatable portions 44L, 44R of this specific embodiment extend obliquely rearward from the left and right ends of the front inflatable portion 43 such that the leading ends 44c draw farther away from each other, as can be seen in FIG. 7. The side inflatable portions 44L and 44R are generally bilaterally symmetrical in shape as fully inflated. The head protecting portion 42 is in gas communication with the main inflatable portion 28 by the lower end of the front inflatable portion 43, thus configured to receive an inflation gas via the main inflatable portion 28. In this specific embodiment, the head protecting portion 42 is formed into a generally board shape having a generally uniform thickness from the front inflatable portion 43 to the side inflatable portions 44L, 44R. This board shape and inclination of the side inflatable portions 44L, 44R with respect to the front inflatable portion 43 are formed by a pair of regulating tethers 47L, 47R located inside of the head protecting portion 42. More specifically, the front inflatable portion 43 includes a front wall 43a and a rear wall 43b while each of the side inflatable portions 44L, 44R includes a front wall 44a and a rear wall 44b, each of which are opposed to each other in the front and back direction. As can be seen in FIG. 7, each of the regulating tethers 47L, 47R connects a center in the left and right direction of the front wall 43a of the front inflatable portion 43 and a border between the rear wall 43b of the front inflatable portion 43 and the rear wall 44b of the side inflatable portion 44L/44R. In this specific embodiment, the regulating tethers 47L, 47R are bilaterally symmetrical in shape, and each formed of a band-shaped body whose width in an up and down direction is slightly smaller than that of the head protecting portion 42, as can be seen in FIGS. 5 and 6. A length of each of the regulating tethers 47L, 47R is set so as to make the side inflatable portions 44L, 44R steadily inclined with respect to the front inflatable portion 43.

To describe more specifically, the head protecting portion 42 (i.e. the front inflatable portion 43 and side inflatable portions 44L, 44R) has such a width in the up and down direction as to be able to cover generally an entirety of the head MH of the occupant MP in the up and down direction. An inclination angle θ (FIG. 7) of the side inflatable portions 44L, 44R with respect to the front inflatable portion 43 is approximately 40°, in this specific embodiment. A width in the left and right direction of each of the side inflatable portions 44L, 44R is set so as to cover a front half region of the head MH of the occupant MP sitting in the seat 1, as viewed from side of the airbag 25 as deployed, as can be seen in FIGS. 7 and 11. As described above, the width in the left and right direction of the front inflatable portion 43 is generally identical to that of the main inflatable portion 28, which is sufficient for covering generally an entirety of the upper body MU of the occupant MP. In other words, the front inflatable portion 43 of this specific embodiment is greater in width in the left and right direction than the head MH. Further, the side inflatable portions 44L and 44R extend from the left and right ends of the front inflatable portion 43 in such a manner as to draw away from each other. That is, the head protecting portion 42 is configured to cover the front and sides of the head MH of the occupant MP while leaving a void space between itself and the head MH. The head protecting portion 42 is provided for cushioning and protecting the head MH of the occupant MP moving forward or diagonally forward in the event that an impact is applied to the seat 1 from forward or diagonally forward. A thickness of the head protecting portion 42 as fully inflated is such as to restrain the moving head MH of the occupant MP steadily.

Figure 9:
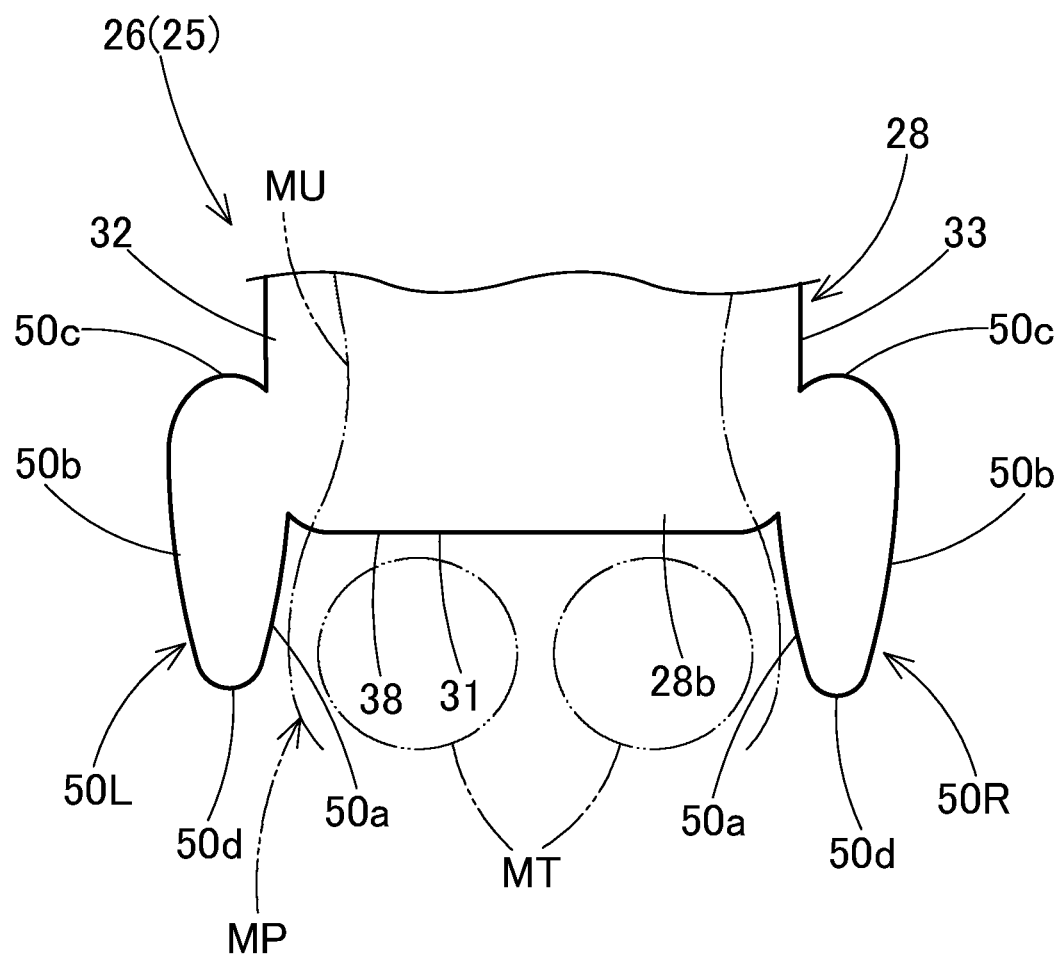
FIG. 9 is a schematic partial vertical sectional view of the airbag of FIG. 4 taken along a left and right direction at the thigh arresting portions.

The thigh arresting portions 50L, 50R as the positioning inflatable portions protrude downwardly from left and right ends of the lower end 28b region of the main inflatable portion 28. In this specific embodiment, the thigh arresting portions 50L, 50R are identical in outer shape, and located at bilaterally symmetrical positions with respect to the center in the left and right direction of the main inflatable portion 28. As viewed from side, each of the thigh arresting portions 50L, 50R is located generally at the center in the front and back direction of the main inflatable portion 28, as can be seen in FIG. 6. As can be seen in FIGS. 5 and 9, the thigh arresting portions 50L, 50R protrude outwardly in the left and right direction while extend downwardly from the lower end 28b region of the main inflatable portion 28. The thigh arresting portions 50L, 50R are each in communication with the main inflatable portion 28 by the upper end 50c regions, thus configured to receive an inflation gas via the main inflatable portion 28. Each of the thigh arresting portions 50L, 50R includes an inner wall 50a and an outer wall 50b which are opposed to each other in an inboard-outboard direction. To describe more specifically, each of the thigh arresting portions 50L, 50R has such a profile at airbag deployment that the width in an up and down direction is greater than the width in a front and back direction and that narrows towards the leading end (i.e. lower end 50d), as can be seen in FIG. 6. Each of the thigh arresting portions 50L, 50R as fully inflated has an outer shape that narrows towards the leading end (i.e. lower end 50d) when viewed from the front or back, too, as can be seen in FIGS. 5 and 9. The inner walls 50a of the thigh arresting portions 50L, 50R, which are opposed to each other at airbag deployment, extend obliquely so as to draw apart from each other towards the leading ends (i.e. lower ends 50d), when viewed from the front or back. Referring to FIG. 9, a distance between the root regions (or upper end 50c regions) of the thigh arresting portions 50L, 50R at airbag deployment is set to be slightly greater than a width of thighs MT of an average-sized adult occupant (which corresponds to AM50 dummy). A width in the up and down direction of each of the thigh arresting portions 50L, 50R is so set as to cover sides of the thighs MT generally entirely.

In the exemplary embodiment, the inner walls 50a of the thigh arresting portions 50L, 50R constitute contact surfaces that contact with and is supported by side surfaces of the thighs MT (which serves as an environmental member disposed in a circumference of the lap belt 10 as restraining the pelvic region MW of the occupant MP) at airbag deployment. Since the inner walls 50a of the thigh arresting portions 50L, 50R, i.e. the contact surfaces, are located bilaterally symmetrically with respect to the center in the left and right direction of the main inflatable portion 28, when the main inflatable portion 28 is deployed in such a manner that its center in the left and right direction is dislocated from the center in the left and right direction of the upper body MU of the occupant MP, one of the contact surfaces (i.e. the inner walls 50a of the thigh arresting portions 50L, 50R) will butt a side of the thigh MT, so that the airbag 25 will move towards the opposite direction by a reaction force and the position of the main inflatable portion 28 will be corrected such that the center in the left and right direction of the main inflatable portion 28 as deployed and the center in the left and right direction of the upper body MU of the occupant MP are generally aligned. The thigh arresting portions 50L, 50R are also designed to restrain the thighs MT of the occupant MP from moving outwardly in the left and right direction when an impact is applied to the seat 1 from forward or diagonally forward. To this end, a thickness of each of the thigh arresting portions 50L, 50R as fully inflated is so set as to restrain the moving thighs MT of the occupant MP steadily.

Figure 12:
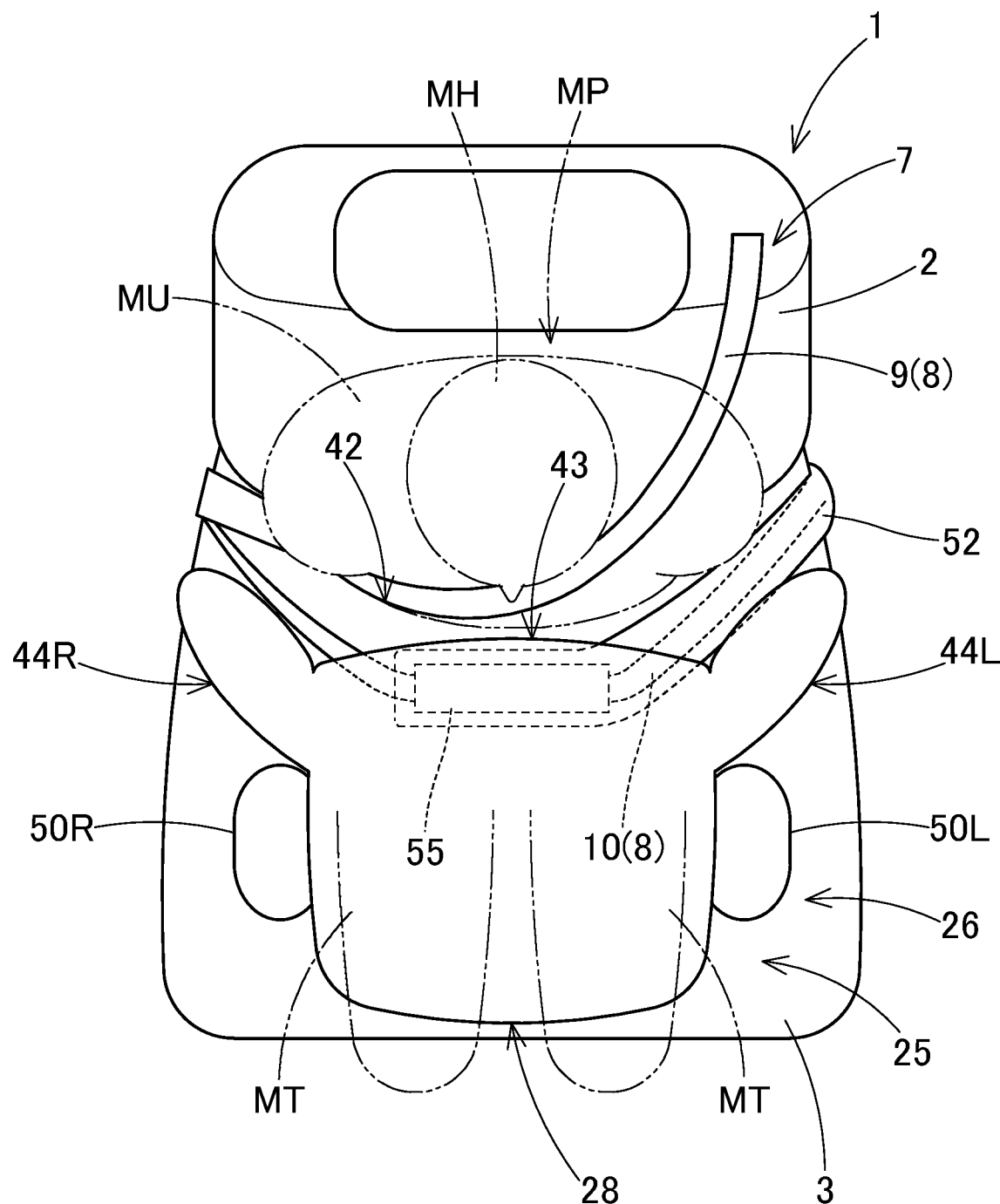
FIG. 12 is a plan view of the seat at airbag deployment.

The conduit portion 52 is coupled to the bag body 26 at the leading end 52b, which is closed, and connected to the pipe 19 at the root region 52a. As can be seen in FIG. 12, the conduit portion 52 is designed to extend along a left and right direction, generally along the lap belt 10 at airbag deployment. Referring to FIGS. 5, 6, and 8, the conduit portion 52 is joined to an underside of the main inflatable portion 28 of the bag body 26 as deployed by the leading end 52b region, where the afore-described communication holes 35 provide gas communication between the conduit portion 52 and main inflatable portion 28. A length of the conduit portion 52 at airbag deployment is set so that a center in the left and right direction of its region joined to the main inflatable portion 28 (the region provided with the communication holes 35) is generally aligned with the center in the left and right direction of the upper body of an averaged-sized adult occupant (which corresponds to AM50 dummy) sitting in the seat 1.

The mounting portion 55 which attaches the bag body 26 to the lap belt 10 is located on an underside of the leading end 52b region of the conduit portion 52, in this specific embodiment. The mounting portion 55 is formed into a tube so that the lap belt 10 goes there through, and is arranged generally along the left and right direction, i.e. generally along the lap belt 10, as can be seen in FIGS. 5, 6 and 8. The mounting portion 55 is so arranged that its center in the left and right direction is generally aligned with the center in the left and right direction of the main inflatable portion 28 as fully inflated. With the configuration that the lap belt 10 is passed through the mounting portion 55, the airbag 25 (or bag body 26) is coupled to the lap belt 10 in such a manner as to be movable relative the lap belt 10 in the left and right direction (i.e. in a length direction of the lap belt 10) to a certain degree.

Figure 10:
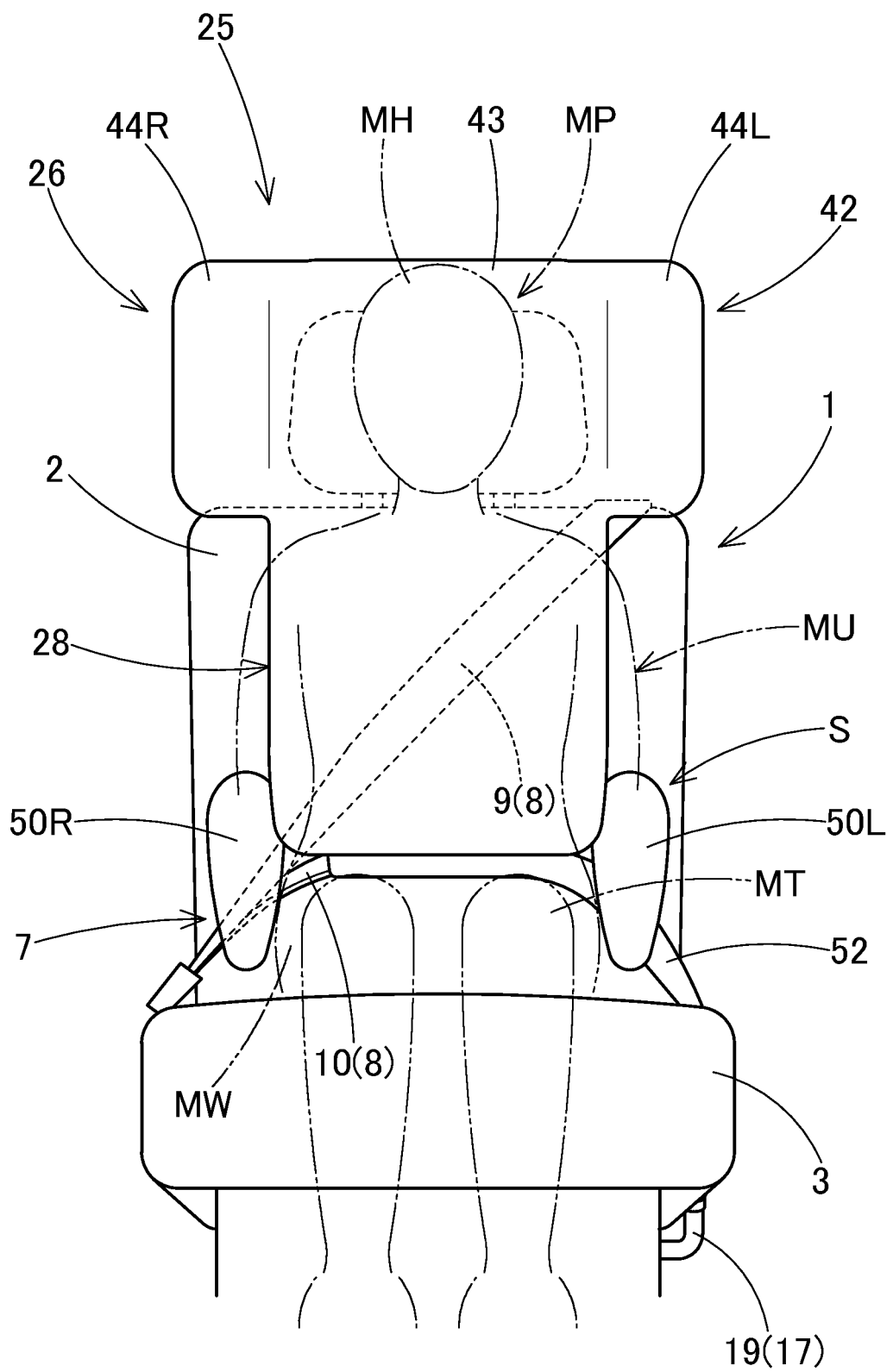
FIG. 10 is a front view of the seat at airbag deployment.

When the inflator 17 of the occupant protection system S in accordance with the exemplary embodiment as mounted on a vehicle is actuated, an inflation gas emitted from the inflator 17 will flow into the bag body 26 via the conduit portion 52, so that the bag body 26 will break the cover 22 and protrudes forward and upwardly from the lap belt 10, and be deployed as can be seen in FIG. 3 (with dashed-and-double-dotted lines) and FIGS. 10 to 12.

In the occupant protection system S in accordance with the exemplary embodiment, each of the thigh arresting portions (i.e. the positioning inflatable portions) 50L, 50R includes the contact surface (i.e. the inner wall 50a) that contacts and is supported by the thigh MT of the occupant MP (i.e. the environmental member or object which is disposed in a circumference of the lap belt 10 as restraining the pelvic region MW of the occupant MP at airbag deployment) at airbag deployment. The occupant protection system S is able to position the airbag 25 at airbag deployment such that the center in the left and right direction of the main inflatable portion 28 is generally aligned with the center in the left and right direction of the upper body MU of the occupant MP by making the contact surface (i.e. the inner wall 50a) of the thigh arresting portion (i.e. the positioning inflatable portion) 50L, 50R butt the environmental member. To describe more specifically, when the airbag 25 protrudes from the storage in the lap belt 10 (the region enclosed by the cover 22), the airbag 25 may be deployed in such a manner that the center in the left and right direction of the main inflatable portion 28 is slightly dislocated to the left or right from the center in the left and right direction of the upper body MU of the occupant MP. At this time, since the airbag 25 is coupled to the lap belt 10 in a movable fashion with respect to the lap belt 10 by the mounting portion 55, if one of the inner walls 50a of the thigh arresting portions 50L, 50R butts a side surface of the thigh MT, the airbag 25 will be moved back from the dislocating direction by a reaction force, so that the center in the left and right direction of the main inflatable portion 28 will be generally aligned with the center in the left and right direction of the upper body MU of the occupant MP. With this simple configuration, the position of the main inflatable portion 28 of the airbag 25 is controlled steadily at deployment and the main inflatable portion 28 restrains the upper body MU of the occupant MP adequately. In the occupant protection system S in accordance with the exemplary embodiment, especially, the airbag 25 is stored in the storage in the lap belt 10 of the three-point seat belt (in the void space formed between the lap belt 10 and the cover 22) in the folded form 57. Although the position of the storage (i.e. position of the airbag 25) in the seatbelt as worn by the occupant MP can vary with respect to the occupant MP due to difference in physical size of the occupant MP, the position of the main inflatable portion 28 of the airbag 25 with respect to the upper body MU of the occupant MP will be controlled steadily by the thigh arresting portions (i.e. the positioning inflatable portions) 50L, 50R formed in the airbag 25 at airbag deployment even if the airbag 25 is stored in a position dislocated from the center in the left and right direction of the occupant MP. Thus, the position of the main inflatable portion 28 of the airbag 25 will be controlled steadily such that the center in the left and right direction of the main inflatable portion 28 is generally aligned with that of the occupant MP, and the main inflatable portion 28 will protect the upper body MU of the occupant MP adequately.

Therefore, the occupant protection system S in accordance with the exemplary embodiment is able to protect the upper body MU of the occupant MP adequately with the airbag 25 stored in the lap belt 10 despite its simple configuration.

Figure 14:
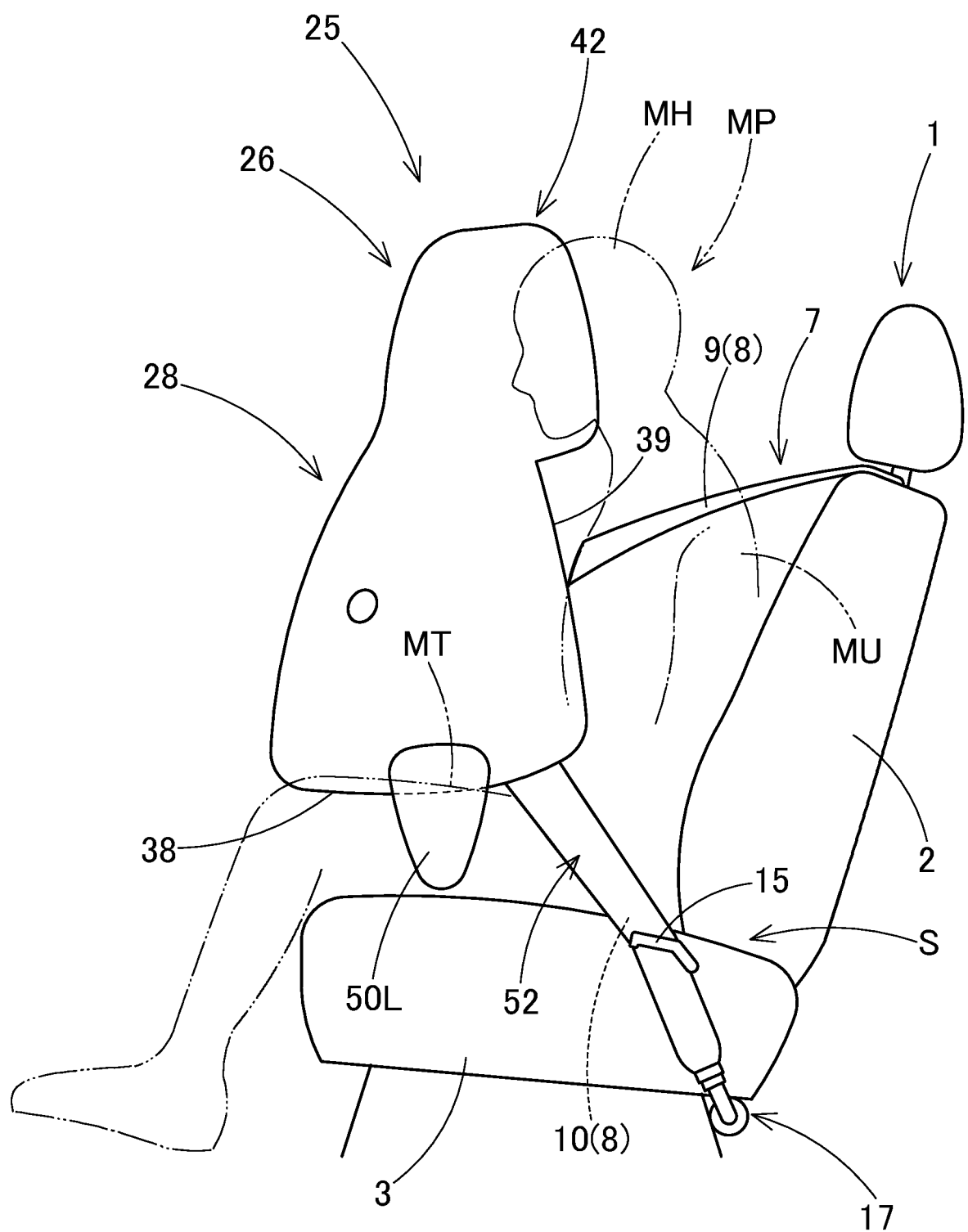
FIG. 14 is a side view of the occupant protection system depicting the way the airbag as fully inflated restrains the occupant.

In the occupant protection system S in accordance with the exemplary embodiment, the main inflatable portion 28 of the airbag 25 is configured to be inflated into a generally triangular prism extending generally along the left and right direction so as to be deployed over the front of the upper body MU of the occupant MP with the thigh contact surface 38 contacting with upper surfaces of the thighs MT. With this configuration, at airbag deployment, the thigh contact surface 38 of the main inflatable portion 28 will be supported by the thighs MT by a wide area, and the upper-body arresting surface 39 which is configured to face the occupant MP will arrest the upper body MU of the occupant MP, so that a bending of the occupant MP, i.e. a behavior of the occupant MP that the upper body MU moves towards the lower body MD, will also be prevented, as can be seen in FIG. 14. In the occupant protection system S in accordance with the exemplary embodiment, the airbag 25 further includes the head protecting portion 42 as well as the thigh arresting portions 50L, 50R for arresting the thighs MT from the left and right. By thus arresting the thighs MT with the thigh arresting portions 50L, 50R and restraining the occupant MP from moving towards the left or right, the airbag 25 will protect an entirety of the upper body MU including the head MH steadily.

Figure 13:
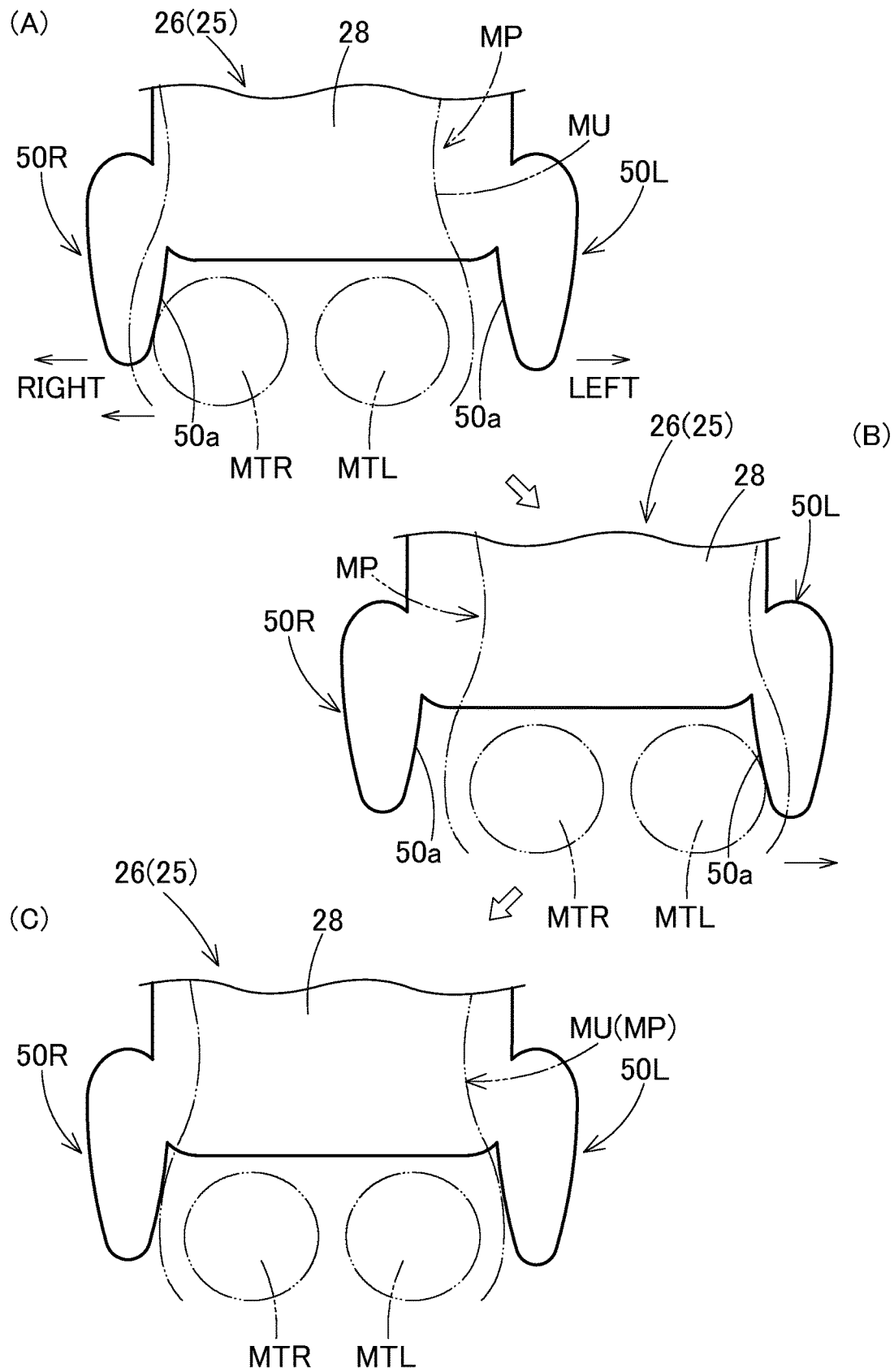
FIG. 13 depicts the way the airbag as fully inflated is subjected to position control with respect to an upper body of the occupant by schematic partial vertical sectional views taken along the left and right direction.

In the occupant protection system S in accordance with the exemplary embodiment, the two thigh arresting portions (i.e. the positioning inflatable portions) 50L, 50R protrude from both ends in the left and right direction of the lower end 28b region of the main inflatable portion 28 at airbag deployment, and the inner walls 50a (i.e. the surfaces of the positioning inflatable portions 50L, 50R that are opposed to each other at airbag deployment) constitute the contact surfaces. With this configuration, when, by way of example, the thigh arresting portion 50R (either one of the thigh arresting portions 50L, 50R) butts a side of the thigh MTR and the airbag 25 (or bag body 26) is restrained from moving towards the left, as can be seen in (A) of FIG. 13, the airbag 25 may move back towards the right too much due to a reaction force. However, since the other thigh arresting portion 50L then butts a side of the thigh MTL as can be seen in (B) of FIG. 13, the airbag 25 will be prevented from moving back too much, so that the airbag 25 will be deployed such that its center in the left and right direction is generally aligned with the center in the left and right direction of the upper body MU of the occupant MP quickly, as can be seen in (C) of FIG. 13, and protect the upper body MU of the occupant MP quickly with the main inflatable portion 28. If such an advantageous effect does not have to be considered, it is also conceivable to locate the positioning inflatable portion 64, 64A only in either left or eight of the main inflatable portion 62, as in later-described airbags 60, 60A depicted in FIGS. 15 and 16. Even with such airbags 60, 60A that includes the positioning inflatable portion only in either left or right, it is basically unlikely that the airbag 60/60A will move in one direction unduly due to reaction force because a conduit portion 67/67A for feeding the bag body 61/61A with an inflation gas is connected with the inflator 17.

In the occupant protection system S in accordance with the exemplary embodiment, moreover, the thigh arresting portions (i.e. the positioning inflatable portions) 50L, 50R are each configured to protrude downwardly from the main inflatable portion 28, and the inner walls (i.e. the contact surfaces) 50a of the thigh arresting portions 50L, 50R extend obliquely in such a manner as to draw apart from each other towards the leading ends (i.e. the lower ends 50d), when viewed from the front or back. The inner walls 50a thus configured help deploy the thigh arresting portions 50L, 50R on the left and right sides of the thighs MT smoothly at airbag deployment. If such an advantageous effect does not have to be considered, the thigh arresting portions may be configured like those in a later-described airbag 75 depicted in FIGS. 17 and 18. In the airbag 75, each of thigh arresting portions 79L, 79R has a generally uniform width (or thickness) in a front and back direction from the root region to the leading end, and inner walls (i.e. contact surfaces) of the thigh arresting portions 79L, 79R which are opposed to each other at airbag deployment extend generally along an up and down direction.

Figure 15:
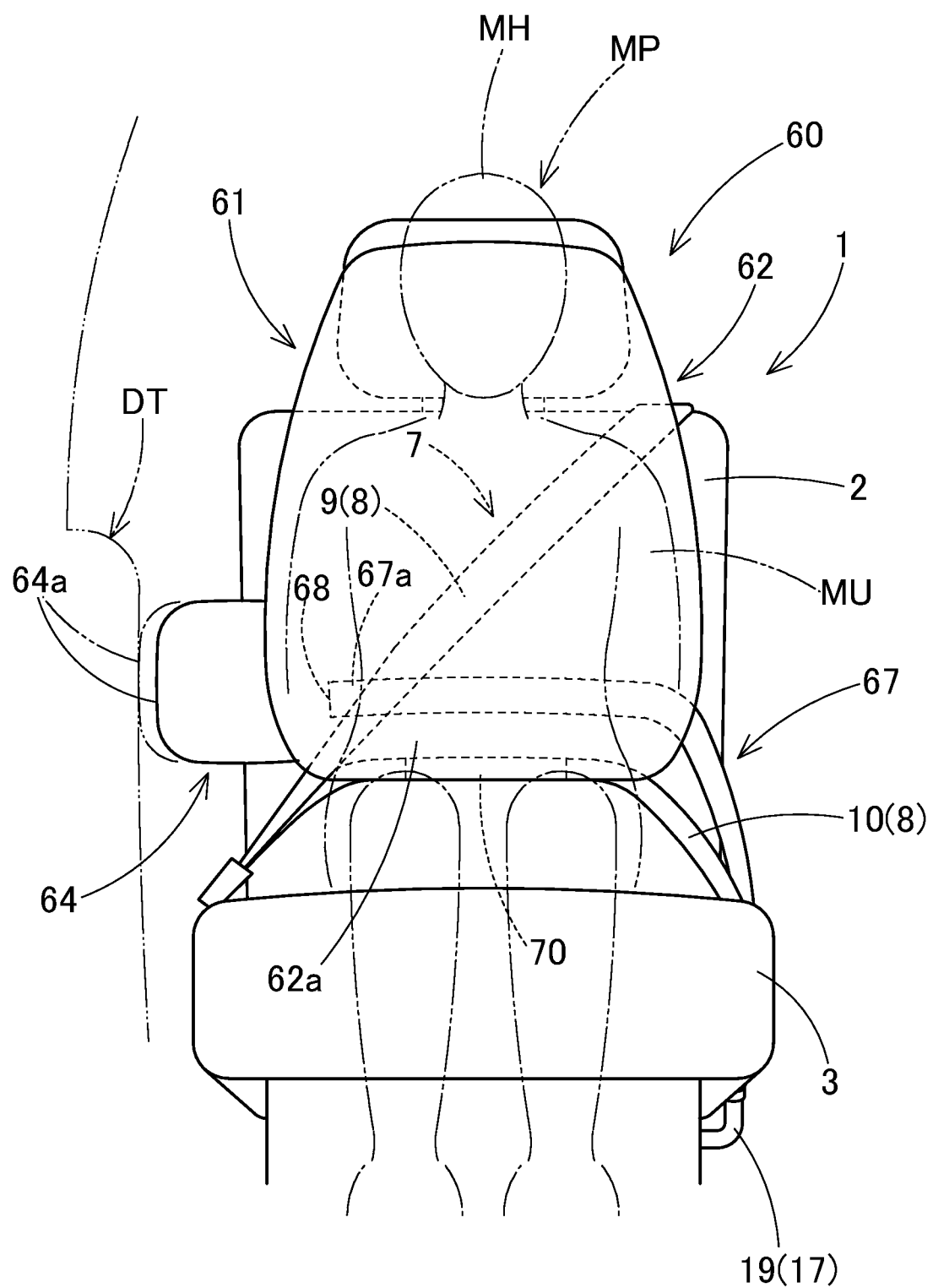
FIG. 15 is a front view of the seat, on which an airbag in accordance with an alternative embodiment is mounted, at airbag deployment.

An airbag 60 in accordance with an alternative embodiment is now described with reference to FIG. 15. The airbag 60 includes a bag body 61, a conduit portion 67 which is connected with the inflator 17 for feeding the bag body 61 with an inflation gas, and a mounting portion 70 which attaches the bag body 61 to the lap belt 10. The bag body 61 includes a main inflatable portion 62 for protecting the upper body MU of the occupant MP, and a positioning inflatable portion 64 located in a vicinity of the lower end 62a of the main inflatable portion 62. In a similar fashion to the mounting portion 55 of the airbag 25 in the foregoing embodiment, the mounting portion 70 is formed into a tube so that the lap belt 10 goes there through, and coupled to an underside of the main inflatable portion 62. The main inflatable portion 62 is configured to be inflated into a generally triangular prism extending generally in a left and right direction. Although not depicted in detail in the drawings, in a similar fashion to the main inflatable portion 28 of the airbag 25 in the foregoing embodiment, the main inflatable portion 62 as fully deployed has a generally right triangular shape which has the oblique side in the front, when viewed from a side (i.e. from the left or right), and has a generally rectangular shape elongated in an up and down direction when viewed from the front or back, as can be seen in FIG. 15. The positioning inflatable portion 64 partially protrudes from a right end (an outboard side in the vehicle width direction) of the lower end 62a region of the main inflatable portion 62. The positioning inflatable portion 64 is in gas communication with the main inflatable portion 62 by the root end (i.e. the left end in an inflated state).

This airbag 60 is configured such that a leading end surface of the positioning inflatable portion 64 serves as a contact surface 64a, and butts a door trim DT that serves as an outboard-side vehicle member which is located in an outer side in the vehicle width direction (i.e. on the right side) of the seat 1 of the vehicle, when the main inflatable portion 62 is deployed in such a manner that its center in the left and right direction is dislocated to an outward direction in the vehicle width direction (i.e. towards the right, in FIG. 15) with respect to the center in the left and right direction of the upper body MU of the occupant MP. Here, the door trim DT constitutes the environmental member that is disposed in a circumference of the lap belt 10 at airbag deployment. When the main inflatable portion 62 is deployed such that its center in the left and right direction is generally aligned with the center in the left and right direction of the upper body MU of the occupant MP, the contact surface 64a of the positioning inflatable portion 64 will not contact with the door trim DT, as can be seen in FIG. 15.

In this airbag 60, the conduit portion 67 constitutes an initial inflow portion that delivers an inflation gas emitted from the inflator 17 towards the positioning inflatable portion 64. More specifically, although the conduit portion 67 is connected with the pipe 19 of the inflator 17 in a similar fashion to the conduit portion 52 of the airbag 25, a leading end 67a region of the conduit portion 67 is inserted into the bag body 61 (or main inflatable portion 62). The leading end 67a region is provided with an opening 68 from which the inflation gas is released. The leading end 67a of the conduit portion 67 is located proximate to the positioning inflatable portion 64 so that the inflation gas is discharged towards the positioning inflatable portion 64 from the opening 68.

This airbag 60 will also be subjected to position control at airbag deployment such that the center in the left and right direction of the main inflatable portion 62 is generally aligned with the center in the left and right direction of the upper body MU of the occupant MP by making the contact surface (i.e. the right surface) 64a of the positioning inflatable portion 64 butt the door trim DT (i.e. the outboard-side vehicle member which serves as the environmental member which is disposed in a circumference of the lap belt 10 as restraining the pelvic region MW of the occupant MP). More specifically, the airbag 60 may be deployed in such a manner that the center in the left and right direction of the main inflatable portion 62 is slightly dislocated to an outboard direction (in other words, to the right or towards the door trim DT) with respect to the center in the left and right direction of the upper body MU of the occupant MP. At this time, since the airbag 60 is coupled to the lap belt 10 in a movable fashion with respect to the lap belt 10 by the mounting portion 70, if the contact surface 64a disposed at the leading end (or right end) of the positioning inflatable portion 64 butts the door trim DT, the airbag 60 will be moved back to the left by a reaction force such that the center in the left and right direction of the main inflatable portion 62 is generally aligned with the center in the left and right direction of the upper body MU of the occupant MP.

With this simple configuration, the position of the main inflatable portion 62 of the airbag will be controlled steadily at deployment and the main inflatable portion 62 will restrain the upper body MU of the occupant MP adequately.

In the airbag 60, the conduit portion 67 serves as the initial inflow portion that delivers an inflation gas emitted from the inflator 17 towards the positioning inflatable portion 64 to inflate the positioning inflatable portion 64 earlier than the main inflatable portion 62. This configuration will inflate the positioning inflatable portion 64 immediately and make the same butt the door trim DT in an initial stage of airbag deployment, thus performing position correction of the main inflatable portion 62 with respect to the upper body MU of the occupant MP quickly.

Figure 16:
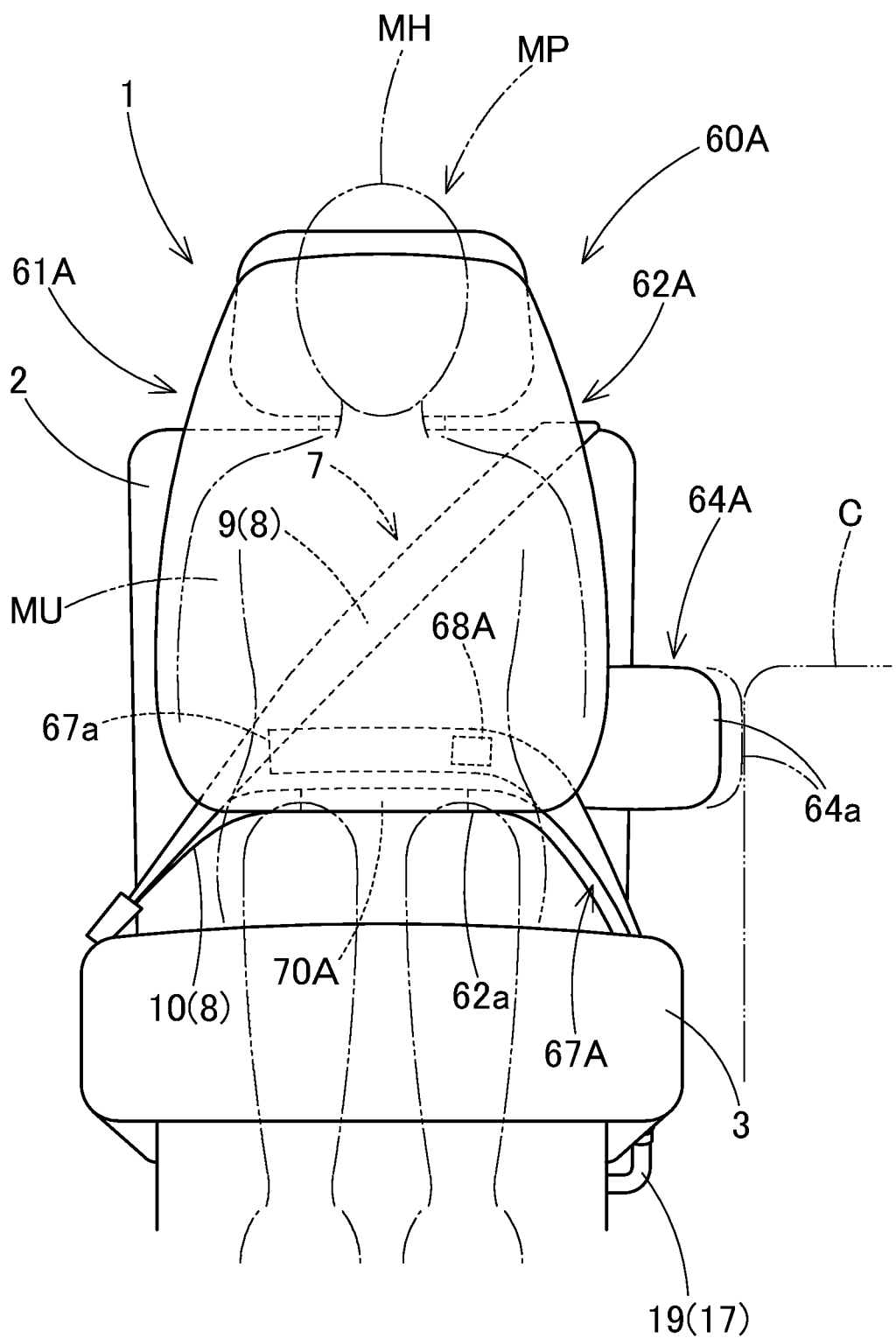
FIG. 16 is a front view of the seat, on which an airbag in accordance with another alternative embodiment is mounted, at airbag deployment.

Further alternatively, the airbag may be configured like an airbag 60A depicted in FIG. 16. The airbag 60A has such a configuration that the airbag 60 is left-right reversed except the conduit portion 67A. A positioning inflatable portion 64A partially protrudes from a left end (an inboard side in the vehicle width direction) of a lower end 62a region of the main inflatable portion 62A. A conduit portion 67A constitutes an initial inflow portion that delivers an inflation gas emitted from the inflator 17 towards this positioning inflatable portion 64A. The conduit portion 67A is closed at the leading end 67a, and includes an outlet port 68A for releasing an inflation gas towards the positioning inflatable portion 64A in the intermediate region. The airbag 60A is designed such that a leading end surface (or left side surface), i.e. a contact surface 64a, of the positioning inflatable portion 64A butts a center console C as an inboard-side vehicle member which is located in an inner side in a vehicle width direction (i.e. on the left side) of the seat 1, when the main inflatable portion 62A is deployed in such a manner that its center in the left and right direction is dislocated to an inward direction in the vehicle width direction (i.e. towards the left) with respect to the center in the left and right direction of the upper body MU of the occupant MP. Here, the center console C constitutes the environmental member which is disposed in a circumference of the lap belt 10 at airbag deployment.

Figure 17:
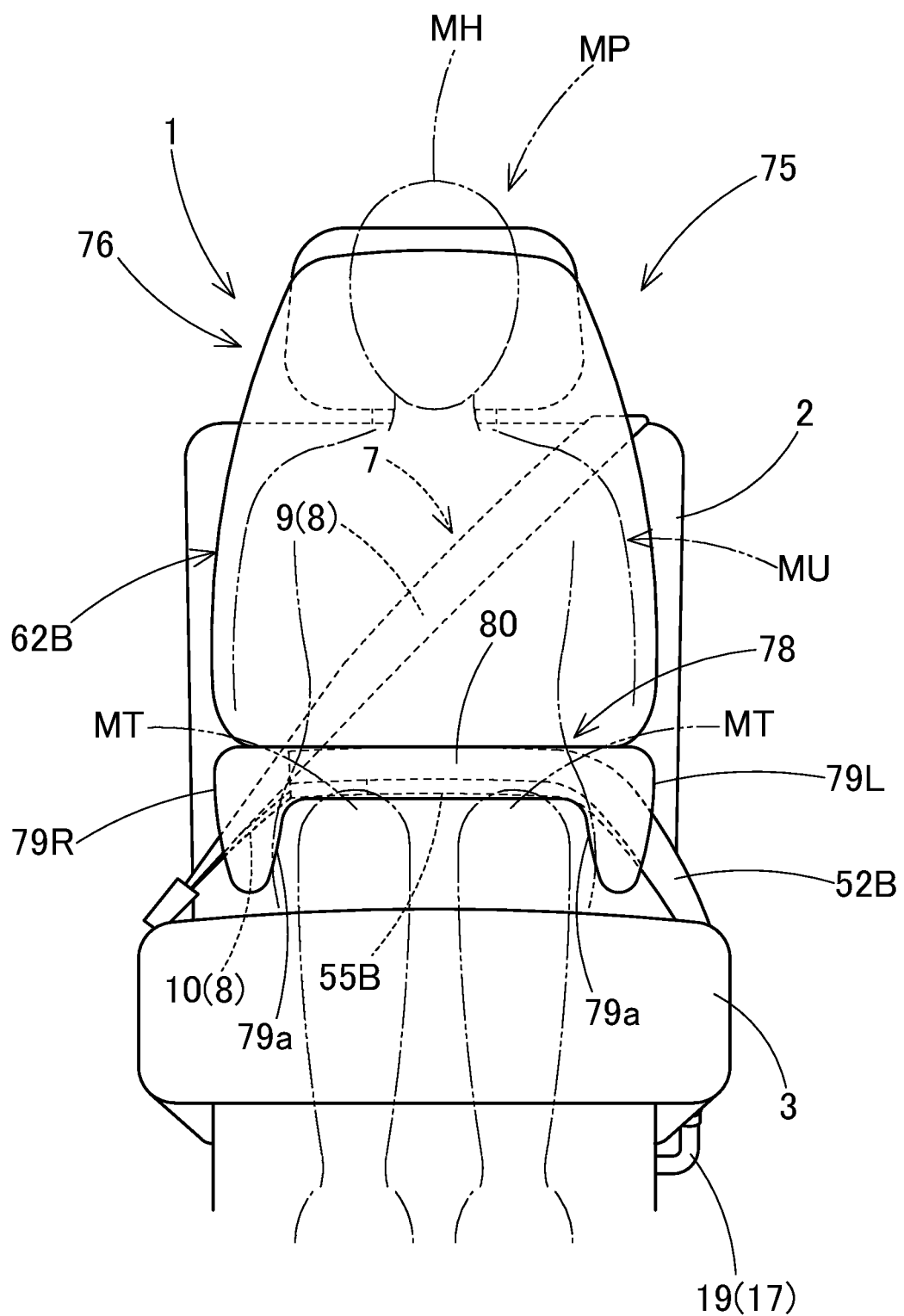
FIG. 17 is a front view of the seat, on which an airbag in accordance with yet another alternative embodiment is mounted, at airbag deployment.
Figure 18:
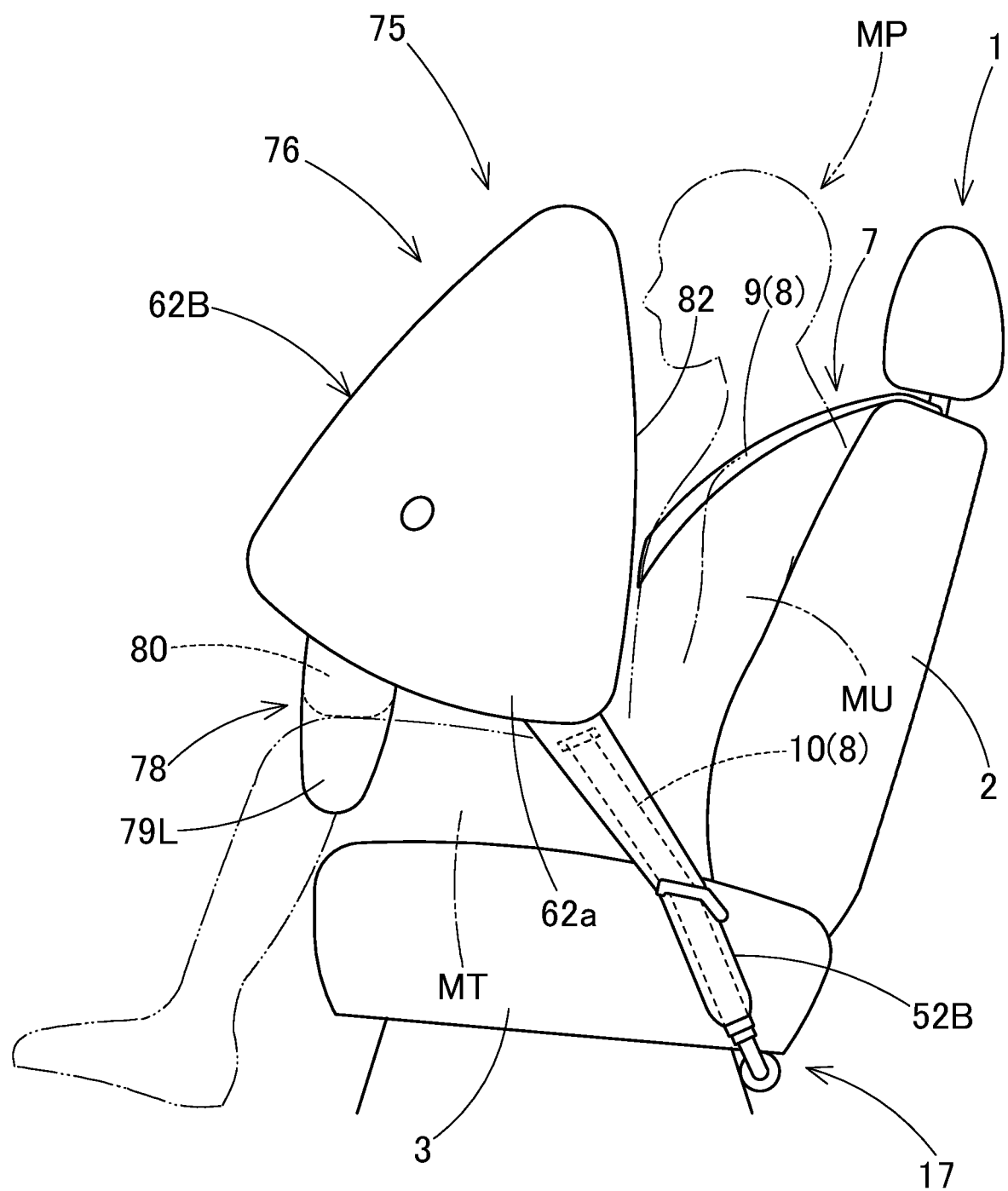
FIG. 18 is a side view of the seat at deployment of the airbag of FIG. 17.

Further alternatively, the airbag may be configured like an airbag 75 depicted in FIGS. 17 and 18. The airbag 75 includes a bag body 76, a conduit portion 52B which is connected with the inflator 17 for feeding the bag body 76 with an inflation gas, and a mounting portion 55B which attaches the bag body 76 to the lap belt 10. The bag body 76 includes a main inflatable portion 62B for protecting the upper body MU of the occupant MP, and a positioning inflatable portion 78 located in a vicinity of a lower end 62a of the main inflatable portion 62B. The conduit portion 52B and the mounting portion 55B each have the same configurations as those of the conduit portion 52 and mounting portion 55 in the airbag 25 in the foregoing embodiment. The main inflatable portion 62B has a similar configuration to that of the airbag 60 in the foregoing embodiment except in communicating with the positioning inflatable portion 78 via a not-shown communication hole disposed in the front lower end region as deployed. The positioning inflatable portion 78 is located proximate to a front end of the main inflatable portion 62B as deployed, and includes a pair of thigh arresting portions 79L, 79R which are configured to be deployed on the left and right sides of the thighs MT, and a connecting portion 80 which is configured to extend generally along a left and right direction and connects upper end regions of the thigh arresting portions 79L and 79R at airbag deployment. The positioning inflatable portion 78 is in gas communication with the main inflatable portion 62B by a region of the connecting portion 80. The thigh arresting portions 79L, 79R are configured to cover left and right sides of the thighs MT. Similarly to the thigh arresting portions 50L, 50R of the airbag 25 in the foregoing embodiment, inner walls of the thigh arresting portions 79L, 79R, which are located in an inner side in the vehicle width direction, serve as contact surfaces 79a which are to butt the thighs MT. In the airbag 75, each of the thigh arresting portions 79L, 79R has a uniform width (or thickness) in a front and back direction from the root region to the leading end, and the inner walls (i.e. contact surfaces 79a) of the thigh arresting portions 79L, 79R which are opposed to each other at airbag deployment extend generally along an up and down direction. The connecting portion 80 connecting the thigh arresting portions 79L, 79R is configured to be inflated generally into a rod shape extending generally along the left and right direction in an underside of the main inflatable portion 62B.

This airbag 75 will also be subjected to position control at airbag deployment such that the center in the left and right direction of the main inflatable portion 62B is generally aligned with the center in the left and right direction of the upper body MU of the occupant MP by making the contact surfaces 79a of the positioning inflatable portion 78 (i.e. the thigh arresting portions 79L, 79R) butt side surfaces of the thighs MT which serve as an environmental member which is disposed in a circumference of the lap belt 10 as restraining the pelvic region MW of the occupant MP. More specifically, the airbag 75 may be deployed in such a manner that the center in the left and right direction of the main inflatable portion 62B is slightly dislocated to the left or right with respect to the center in the left and right direction of the upper body MU of the occupant MP. At this time, since the airbag 75 is coupled to the lap belt 10 in a movable fashion with respect to the lap belt 10 by the mounting portion 55B, if the contact surfaces 79a butt the thighs MT, the airbag 75 will be moved back by a reaction force such that the center in the left and right direction of the main inflatable portion 62B is generally aligned with the center in the left and right direction of the upper body MU of the occupant MP. With this simple configuration, the position of the main inflatable portion 62B of the airbag 75 will be controlled steadily at deployment and the main inflatable portion 62B will restrain the upper body MU of the occupant MP adequately.

In the airbag 75, the positioning inflatable portion 78 includes the connecting portion 80 that connects the thigh arresting portions 79L, 79R and is configured to be inflated into a rod shape in a vicinity of the front end of and in the underside of the main inflatable portion 62B. With this configuration, the connecting portion 80 will lift the front end region of the main inflatable portion 62B so that an upper-body arresting surface 82 of the main inflatable portion 62B, which is designed to be deployed in a vicinity of the upper body MU of the occupant MP, will be deployed at a slant such that the upper end region draws close to the occupant MP, at airbag deployment.

When the positioning inflatable portions are configured to protrude from both the left and right ends of the main inflatable portion, the contact surfaces of the positioning inflatable portions may also be configured to butt and be supported by not only thighs of the occupant but also a seat main body of the seat 1, a lower end region of the seatback of the seat 1, or the like. That is, the environmental member referred to in this specification may be composed of these members.

In the occupant protection system S of the exemplary embodiments, the seatbelt 7 and inflator 17 are mounted on the seat 1. When using the airbag 25 or 75 which performs position control using the thighs MT of the occupant MP as the environmental member, with this configuration, the occupant protection system S will be able to protect the occupant MP sitting in the seat 1 adequately even if the seat 1 is moved largely with respect to the vehicle, like, by being slid forward or backward, or turned. If such an advantageous effect does not have to be considered, the seatbelt may be configured such that the retractor is mounted on the vehicle body like a normal seatbelt for a vehicle, or the inflator may be mounted on the vehicle body.

The exemplary embodiments of the present disclosure relates to an occupant protection system for protecting an occupant sitting in a seat of a vehicle, the occupant protection system including: a three-point seatbelt that includes a lap belt which is configured to arrest a pelvic region of the occupant; an inflator; and an airbag that is formed of a sheet material having flexibility and stored in a storage in the lap belt in a folded form. The airbag is coupled to the lap belt in such a manner as to be movable relative to the lap belt in a left and right direction, and configured to be inflated and deployed upward from the storage when fed with an inflation gas from the inflator. The airbag includes: a main inflatable portion that is configured to be deployed in front of an upper body of the occupant for protecting the upper body; and a positioning inflatable portion that protrudes at least from a first end in a left and right direction of a lower end region of the main inflatable portion, the positioning inflatable portion including a contact surface that contacts and is supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment.

The occupant protection system in accordance with the exemplary embodiment is able to position the airbag at airbag deployment such that the center in the left and right direction of the main inflatable portion is generally aligned with the center in the left and right direction of the upper body of the occupant by making the contact surface of the positioning inflatable portion butt the environmental member which is disposed in a circumference of the lap belt as restraining the pelvic region of the occupant. To describe more specifically, when the airbag protrudes from the storage in the lap belt, the airbag may be deployed in such a manner that the center in the left and right direction of the main inflatable portion is slightly dislocated to the left or right from the center in the left and right direction of the upper body of the occupant. At this time, since the airbag is coupled to the lap belt in a movable fashion with respect to the lap belt, if the contact surface of the positioning inflatable portion butts the environmental member, the airbag will be moved back from the dislocating direction by a reaction force, so that the center in the left and right direction of the main inflatable portion will be generally aligned with the center in the left and right direction of the upper body of the occupant. With this simple configuration, the airbag is able to position the main inflatable portion at deployment steadily and restrain the upper body of the occupant adequately. In the occupant protection system in accordance with the exemplary embodiment, especially, the airbag is stored in the storage in the lap belt of the three-point seat belt in the folded form. Although the position of this storage in the seatbelt as worn by the occupant can vary with respect to the occupant due to difference in physical size of the occupant, the position of the main inflatable portion of the airbag with respect to the upper body of the occupant will be controlled steadily by the positioning inflatable portion formed in the airbag at airbag deployment even if the airbag is stored in a position dislocated from the center in the left and right direction of the occupant. Thus, the position of the main inflatable portion of the airbag will be controlled steadily such that the center in the left and right direction of the main inflatable portion is generally aligned with that of the occupant, and the main inflatable portion will protect the upper body of the occupant adequately.

Therefore, the occupant protection system in accordance with the exemplary embodiment is able to protect the upper body of the occupant adequately with the airbag stored in the lap belt despite its simple configuration.

The environmental member which the contact surface of the positioning inflatable portion is to butt at airbag deployment will be an outboard-side vehicle member which is located in an outer side in a vehicle width direction of the seat, or an inboard-side vehicle member which is located in an inner side in the vehicle width direction of the seat.

In the occupant protection system in accordance with the exemplary embodiment, the airbag may further include an initial inflow portion that delivers an inflation gas emitted from the inflator towards the positioning inflatable portion to inflate the positioning inflatable portion earlier than the main inflatable portion. This configuration will inflate the positioning inflatable portion immediately in an initial stage of airbag deployment so that the positioning inflatable portion butts the environmental member quickly, so that the position control of the main inflatable portion with respect to the upper body of the occupant will be performed quickly.

In the occupant protection system in accordance with the exemplary embodiment, the positioning inflatable portions may be configured to protrude from both ends in the left and right direction of the lower end region of the main inflatable portion at airbag deployment such that surfaces of the two positioning inflatable portions that are opposed to each other at airbag deployment constitute the contact surfaces. With this configuration, when, by way of example, the airbag which has been restrained from moving towards the left or right by either one of the positioning inflatable portions is about to move back to an opposite direction too much due to a reaction force, the other positioning inflatable portion will prevent such a travel of the airbag, so that the airbag will be deployed such that its center in the left and right direction will be generally aligned with the center in the left and right direction of the upper body of the occupant quickly, and protect the upper body of the occupant quickly with the main inflatable portion.

When the occupant protection system is configured like this, the environmental member may be composed of thighs of the occupant. In this case, the positioning inflatable portions may be configured to protrude downwardly from the main inflatable portion so that the contact surfaces may each contact with sides of the thighs at airbag deployment. Further, the contact surfaces may be configured to extend obliquely so as to draw apart from each other towards the leading ends, when viewed from front or back. The contact surfaces thus configured will help deploy the positioning inflatable portions on the left and right sides of the thighs smoothly at airbag deployment.

What is claimed is:

1. An occupant protection system for protecting an occupant sitting in a seat of a vehicle, the occupant protection system comprising:
    a three-point seatbelt that includes a lap belt which is configured to arrest a pelvic region of the occupant;
    an inflator; and
    an airbag that is formed of a sheet material having flexibility and stored in a storage in the lap belt in a folded form, the airbag being coupled to the lap belt in such a manner as to be movable relative to the lap belt in a left and right direction, and configured to be inflated and deployed upward from the storage when fed with an inflation gas from the inflator,
    wherein the airbag includes:
    a main inflatable portion that is configured to be deployed in front of an upper body of the occupant for protecting the upper body; and
a positioning inflatable portion that protrudes at least from a first end in a left and right direction of a lower end region of the main inflatable portion, the positioning inflatable portion including a contact surface that contacts and is configured to be supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment, wherein the main inflatable portion is configured to be inflated into a generally triangular prism extending generally in the left and right direction, wherein:
    the environmental member is an outboard-side vehicle member which is located in an outer side in a vehicle width direction of the seat; and
    the airbag is configured such that the contact surface of the positioning inflatable portion butts the outboard-side vehicle member at airbag deployment; and
    the airbag further includes an initial inflow portion that delivers an inflation gas emitted from the inflator towards the positioning inflatable portion to inflate the positioning inflatable portion earlier than the main inflatable portion.

2. An occupant protection system for protecting an occupant sitting in a seat of a vehicle, the occupant protection system comprising:
    a three-point seatbelt that includes a lap belt which is configured to arrest a pelvic region of the occupant;
    an inflator; and
    an airbag that is formed of a sheet material having flexibility and stored in a storage in the lap belt in a folded form, the airbag being coupled to the lap belt in such a manner as to be movable relative to the lap belt in a left and right direction, and configured to be inflated and deployed upward from the storage when fed with an inflation gas from the inflator,
    wherein the airbag includes:
    a main inflatable portion that is configured to be deployed in front of an upper body of the occupant for protecting the upper body; and
a positioning inflatable portion that protrudes at least from a first end in a left and right direction of a lower end region of the main inflatable portion, the positioning inflatable portion including a contact surface that contacts and is configured to be supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment, wherein the main inflatable portion is configured to be inflated into a generally triangular prism extending generally in the left and right direction, wherein:
    the environmental member is an inboard-side vehicle member which is located in an inner side in a vehicle width direction of the seat;
    the airbag is configured such that the contact surface of the positioning inflatable portion butts the inboard-side vehicle member at airbag deployment; and
    the airbag further includes an initial inflow portion that delivers an inflation gas emitted from the inflator towards the positioning inflatable portion to inflate the positioning inflatable portion earlier than the main inflatable portion.

3. An occupant protection system for protecting an occupant sitting in a seat of a vehicle, the occupant protection system comprising:
    a three-point seatbelt that includes a lap belt which is configured to arrest a pelvic region of the occupant;
    an inflator; and
    an airbag that is formed of a sheet material having flexibility and stored in a storage in the lap belt in a folded form, the airbag being coupled to the lap belt in such a manner as to be movable relative to the lap belt in a left and right direction, and configured to be inflated and deployed upward from the storage when fed with an inflation gas from the inflator,
    wherein the airbag includes:
    a main inflatable portion that is configured to be deployed in front of an upper body of the occupant for protecting the upper body; and
a positioning inflatable portion that protrudes at least from a first end in a left and right direction of a lower end region of the main inflatable portion, the positioning inflatable portion including a contact surface that contacts and is configured to be supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment, wherein the main inflatable portion is configured to be inflated into a generally triangular prism extending generally in the left and right direction, wherein:
    the environmental member is thighs of the occupant;
    the positioning inflatable portion is located proximate to a front end of and in the underside of the main inflatable portion as deployed;
    the positioning inflatable portion includes a pair of thigh arresting portions that are configured to be deployed on left and right sides of the thighs, and a connecting portion which is configured to be inflated generally into a rod shape extending generally along a left and right direction and connects upper end regions of the thigh arresting portions; and
    surfaces of the thigh arresting portions that are opposed to each other at airbag deployment constitute the contact surfaces.

4. The occupant protection system of claim 3, wherein the seatbelt and the inflator are mounted on the seat.

5. An occupant protection system for protecting an occupant sitting in a seat of a vehicle, the occupant protection system comprising:
- a three-point seatbelt that includes a lap belt which is configured to arrest a pelvic region of the occupant;
- an inflator; and
- an airbag that is formed of a sheet material having flexibility and stored in a storage in the lap belt in a folded form, the airbag being coupled to the lap belt in such a manner as to be movable relative to the lap belt in a left and right direction, and configured to be inflated and deployed upward from the storage when fed with an inflation gas from the inflator, wherein the airbag includes:
- a main inflatable portion that is configured to be deployed in front of an upper body of the occupant for protecting the upper body; and
- a positioning inflatable portion that protrudes at least from a first end in a left and right direction of a lower end region of the main inflatable portion, the positioning inflatable portion including a contact surface that contacts and is supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment, wherein:
- the environmental member is an outboard-side vehicle member which is located in an outer side in a vehicle width direction of the seat;
- the airbag is configured such that the contact surface of the positioning inflatable portion butts the outboard-side vehicle member at airbag deployment; and
- the airbag further includes an initial inflow portion that delivers an inflation gas emitted from the inflator towards the positioning inflatable portion to inflate the positioning inflatable portion earlier than the main inflatable portion.

6. An occupant protection system for protecting an occupant sitting in a seat of a vehicle, the occupant protection system comprising:
- a three-point seatbelt that includes a lap belt which is configured to arrest a pelvic region of the occupant;
- an inflator; and
- an airbag that is formed of a sheet material having flexibility and stored in a storage in the lap belt in a folded form, the airbag being coupled to the lap belt in such a manner as to be movable relative to the lap belt in a left and right direction, and configured to be inflated and deployed upward from the storage when fed with an inflation gas from the inflator, wherein the airbag includes:
- a main inflatable portion that is configured to be deployed in front of an upper body of the occupant for protecting the upper body; and
- a positioning inflatable portion that protrudes at least from a first end in a left and right direction of a lower end region of the main inflatable portion, the positioning inflatable portion including a contact surface that contacts and is supported by an environmental member which is disposed in a circumference of the lap belt at airbag deployment, the positioning inflatable portion helping align a center in the left and right direction of the main inflatable portion generally with a center in a left and right direction of the upper body by making the contact surface butt the environmental member at airbag deployment, wherein:
- the environmental member is an inboard-side vehicle member which is located in an inner side in a vehicle width direction of the seat;
- the airbag is configured such that the contact surface of the positioning inflatable portion butts the inboard-side vehicle member at airbag deployment; and
- the airbag further includes an initial inflow portion that delivers an inflation gas emitted from the inflator towards the positioning inflatable portion to inflate the positioning inflatable portion earlier than the main inflatable portion.

* * * * *